(12) United States Patent  
Trevor et al.

(10) Patent No.: US 8,521,754 B2  
(45) Date of Patent: Aug. 27, 2013

(54) SYSTEM AND METHODS FOR WEB DATA TRANSFORMATION SOURCING

(75) Inventors: Jonathan Trevor, Menlo Park, CA (US); Sam Pullara, Los Altos, CA (US); Nagesh Susarla, Fremont, CA (US); Paul Donnelly, Menlo Park, CA (US); Joshua Gordineer, San Jose, CA (US); Mirek Grymuza, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 256 days.

(21) Appl. No.: 12/696,012

(22) Filed: Jan. 28, 2010

(65) Prior Publication Data

US 2011/0099159 A1    Apr. 28, 2011

Related U.S. Application Data

(63) Continuation-in-part of application No. 12/607,804, filed on Oct. 28, 2009, and a continuation-in-part of application No. 12/607,926, filed on Oct. 28, 2009.

(51) Int. Cl.
*G06F 7/00* (2006.01)
*G06F 17/30* (2006.01)

(52) U.S. Cl.
USPC ........................................................ 707/756

(58) Field of Classification Search
None
See application file for complete search history.

(56) References Cited

U.S. PATENT DOCUMENTS

| | | | | |
|---|---|---|---|---|
| 6,463,440 | B1 * | 10/2002 | Hind et al. | 715/235 |
| 6,715,129 | B1 * | 3/2004 | Hind et al. | 715/239 |
| 6,999,512 | B2 * | 2/2006 | Yoo et al. | 375/240.03 |

* cited by examiner

*Primary Examiner* — Michael Hicks  
(74) *Attorney, Agent, or Firm* — Martine Penilla Group, LLP

(57) ABSTRACT

A computer-implemented system for web data transformation sourcing is disclosed to include a search module defined to receive a set of original input data types and a set of ultimate output data types. The search module is defined to locate one or more web based sources defined to transform the set of original input data types into the set of ultimate output data types. The search module is further defined to generate a transformation solution that when executed utilizes the one or more located web based sources to transform the set of original input data types into the set of ultimate output data types. The transformation solution is digitally conveyed.

26 Claims, 17 Drawing Sheets

| Query Parameters [query_params] for the URLs of the QL Web Service |||| 
|---|---|---|---|
| Query Parameter | Required? | Default | Description |
| q | yes | (none) | The QL statement to execute, e.g., SELECT. |
| format | no | xml | The format of the results of the call to the QL Web Service, e.g., xml, json. |
| callback | no | (none) | The name of the JavaScript callback function for JSONP format results. If callback is set and if format=json, then the response format is JSON. |
| diagnostics | no | true | Diagnostic information is returned with the response unless this parameter is set to false. |
| debug | no | (none) | Enables network-level logging of each network call within a QL statement or API query. |

Fig. 12

QL Statements

| QL Statement | Syntax | Description |
|---|---|---|
| SELECT | `SELECT what FROM table WHERE filter [| function]` | Retrieves `what` data from specified `table`. The `filter` is a comparison expression that limits rows returned. The `function` is an optional function to which the `SELECT` results can be piped. |
| SHOW TABLES | `SHOW TABLES` | Gets a list of the QL tables available to QL Web Service. |
| DESC | `DESC table` | Gets a description of the specified QL `table`. |
| USE | `USE "http://myserver.com/mytables.xml" AS mytable;` | Maps a table name (`mytable`) to the URL (`http://myserver.com/mytables.xml`) of a QL Open Data Table. |
| SET | `SET (name) = (value);` | Allows for set up of key value for use within QL Open Data Table. |
| INSERT | `INSERT INTO table (key1, key2, key3) VALUES ('value1','value2','value3')` | Inserts data into the specified QL `table`. |
| UPDATE | `UPDATE (table) SET field1=value WHERE filter` | Updates date in the specified QL `table`. |
| DELETE | `DELETE FROM (table) WHERE filter` | Deletes data in the specified QL `table`. |

Fig. 13

```
                XML Formatted Results Data

<query ... (attributes such as count)>
<diagnostics>
... (sub-elements such as publiclyCallable)

... (data returned by the call to YQL)

</query>
```

Fig. 14

```
                JSON Formatted Results Data
{
"query": {
"count": ...
...
"diagnostics": {
"publiclyCallable": ...,
...
},
"results": {
// data returned by call to YQL
...
}
```

Fig. 15

SYSTEM AND METHODS FOR WEB DATA TRANSFORMATION SOURCING

CLAIM OF PRIORITY

This application is a continuation-in-part application of prior application Ser. No. 12/607,804, filed on Oct. 28, 2009, entitled "System for Querying and Consuming Web-Based Data and Associated Methods." This application is also a continuation-in-part application of prior application Ser. No. 12/607,926, filed on Oct. 28, 2009, entitled "Developer Interface and Associated Methods for System for Querying and Consuming Web-Based Data." The disclosure of each above-identified patent application is incorporated in its entirety herein by reference.

BACKGROUND OF THE INVENTION

In today's web (internet) universe, there exist thousands of web services and web data sources that provide valuable data to a developer for use in building an application. In order to secure the correct web based data, the developer needs to scour the web to find the desired data. Such scouring of the web for data, or identifying sources (APIs) of data is a tedious process. Additionally, the developer may need the available web data to be transformed in order to be usable in the application under development. Additionally, the developer may require another application programming interface (API) or other process in order to properly output data generated from the acquired, and possibly transformed, web data. In this regard, the developer may need to write their own process, i.e., API, or find an existing API on the web that can be modified to provide the necessary function.

In view of the foregoing, there is a need for improved systems and methods to enable a developer to discover, from multiple and diverse web services and web data sources, one or more processes that can be implemented to associate between different web based data types.

SUMMARY OF THE INVENTION

In one embodiment, a computer-implemented system for web data transformation sourcing is disclosed. The system includes a search module defined to locate one or more web based sources defined to transform a set of original input data types into a set of ultimate output data types. The search module is further defined to generate and digitally convey a transformation solution that when executed utilizes the one or more located web based sources to transform the set of original input data types into the set of ultimate output data types.

In another embodiment, a method is disclosed for web data transformation sourcing. The method includes an operation for providing a set of original input data types as input to a web source search engine. The method also includes an operation for providing a set of ultimate output data types as input to the web source search engine. The method further includes operating the web source search engine to automatically search for one or more web based sources that will transform the set of original input data types into the set of ultimate output data types. Upon locating the one or more web based sources, the method includes operating the web source search engine to automatically generate a universal resource locator (URL) that upon execution will utilize the one or more web based sources to provide output data corresponding to the set of ultimate output data types, based on input data corresponding to the set of original input data types. The method also includes an operation for digitally conveying the generated URL for use in web data transformation in which output data corresponding to the set of ultimate output data types is to be generated based on input data corresponding to the set of original input data types.

In another embodiment, a method is disclosed for web data transformation sourcing. The method includes an operation for providing a set of original input data types as input to a web source search engine. The method also includes operating the web source search engine to automatically search for a web based source that will transform the set of original input data types into one or more output data types. Upon locating the web based source, the method includes operating the web source search engine to automatically generate a URL that upon execution will utilize the web based source to provide output data corresponding to the one or more output data types, based on input data corresponding to the set of original input data types. The method further includes an operation for digitally conveying the one or more output data types and the generated URL for use in web data transformation in which output data corresponding to the one or more output data types is to be generated based on input data corresponding to the set of original input data types.

In another embodiment, a method is disclosed for web data transformation sourcing. The method includes an operation for providing a set of ultimate output data types as input to a web source search engine. The method also includes operating the web source search engine to automatically search for a web based source that will transform one or more input data types into the set of ultimate output data types. Upon locating the web based source, the method includes operating the web source search engine to automatically generate a URL that upon execution will utilize the web based source to provide output data corresponding to the set of ultimate output data types, based on input data corresponding to the one or more input data types. The method further includes an operation for digitally conveying the one or more input data types and the generated URL for use in web data transformation in which output data corresponding to the set of ultimate output data types is to be generated based on input data corresponding to the one or more input data types.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 12 shows a table of query parameters [query_params] for the URLs of the QL Web Service, in accordance with one embodiment of the present invention;

FIG. 13 shows a table of QL statements that can be submitted to the QL Web Service via the query parameter [q=] in the URL of the QL Web Service, in accordance with one embodiment of the present invention;

FIG. 14 shows the basic structure of the XML formatted output data in the response generated by a call to the QL Web Service, in accordance with one embodiment of the present invention;

FIG. 15 shows the basic structure of the JSON formatted output data in the response generated by a call to the QL Web Service, in accordance with one embodiment of the present invention;

DETAILED DESCRIPTION

Figure 1:
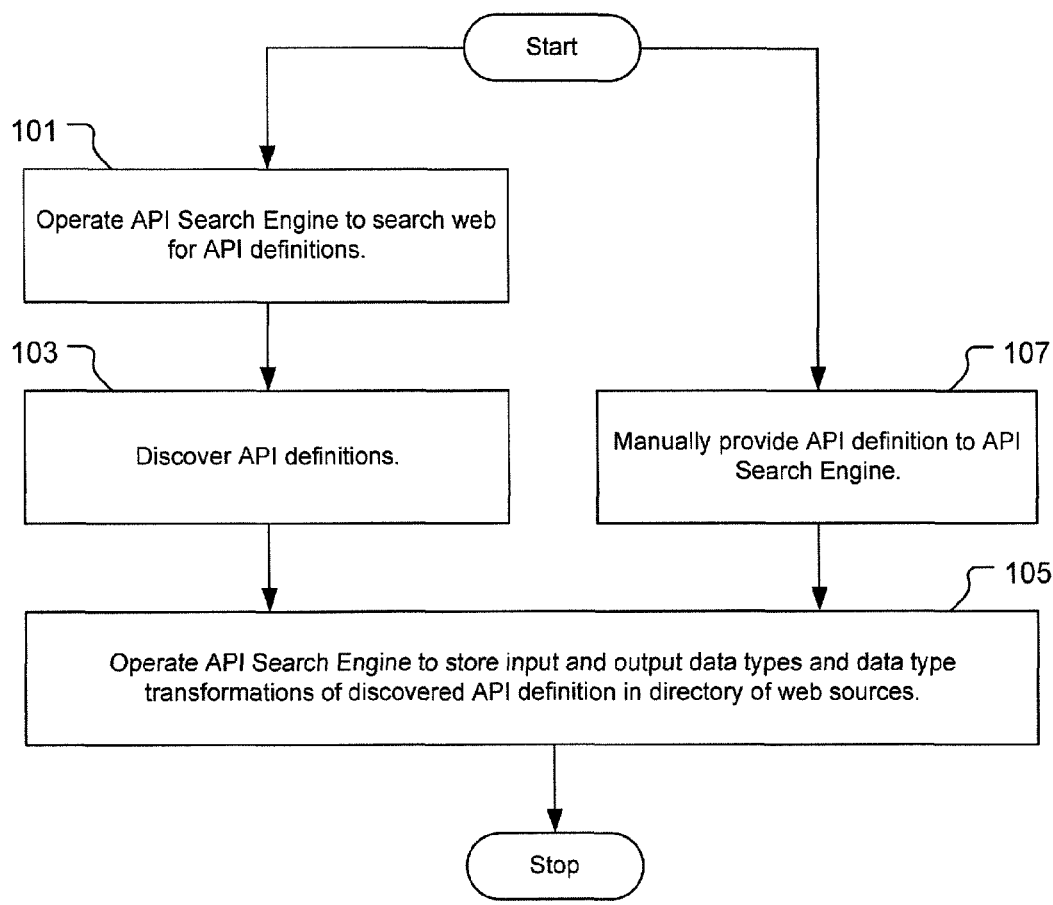
FIG. 1 shows a method for generating a directory of web sources available for use by the API search engine, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Systems and methods are disclosed herein for web data transformation sourcing in which one or more user-specified data types are received as input parameters, and one or more corresponding web sources, e.g., application programming interfaces (APIs), are searched out and located. The corresponding web sources are defined to operate on the one or more user-specified data types as either an input data type or an output data type. As used herein, the term data type refers to structured pieces of data that have semantic meaning. For example, a "photo" data type is not an actual picture, but rather data about a picture, such as where it can be loaded from, its dimensions, where it was taken, what camera was used, etc. Data types as referenced herein may be user-defined (e.g., an IP address), or may be previously well-defined (e.g., dublin core data types for describing meta data about documents), or may be defacto standards (e.g., a geolocation having "latitude" and "longitude" elements).

In one embodiment, the one or more user-specified data types represent one or more originating input data types to be correlated to one or more other data types by way of the corresponding web sources that are searched out and located. In this embodiment, the systems and methods for web data transformation sourcing operate to discover corresponding web sources that are each capable of generating data types that are correlated to the one or more originating input data types, and convey to the user both the discovered corresponding web sources and the data types that they are capable of generating. The user is then equipped to utilize a particular discovered web source and its associated output data type(s) to obtain web content in the associated output data type(s) that is correlated to web content in the one or more originating input data types.

In another embodiment, the one or more user-specified data types represent one or more ultimate output data types to be correlated to one or more other data types by way of the corresponding web sources that are searched out and located. In this embodiment, the systems and methods for web data transformation sourcing operate to discover corresponding web sources that are each capable of generating the one or more ultimate output data types from one or more input data types, and convey to the user both the discovered corresponding web sources and the input data types that can be operated on to generate the one or more ultimate output data types. The user is then equipped to utilize a particular discovered web source and its associated input data type(s) to obtain web content in the one or more output data type(s) that is correlated to web content in the associated input data type(s).

In another embodiment, the one or more user-specified data types represent both one or more originating input data types and one or more ultimate output data types. In this embodiment, the systems and methods for web data transformation sourcing operate to discover one or more web sources that capable of generating the one or more ultimate output data types based on the one or more originating input data types. The user is then equipped to utilize the one or more discovered web sources to obtain web content in the one or more ultimate output data types that is correlated to web content in the one or more originating input data types.

The systems and methods for web data transformation as disclosed herein are capable of discovering web sources that can effectively transform between data types, such that the discovered web sources can be applied to obtain web content in a given output data type based on data specified in a given input data type, thereby transforming the data specified in the given input data type into associated web content in the given output data type. Also, the systems and methods for web data transformation as disclosed herein are capable of discovering and linking multiple web sources to enable transformation between a particular input data type and a particular output data type. Further, the systems and methods for web data transformation as disclosed herein are capable of determining multiple/different web source linking solutions by which a particular input data type can be transformed into a particular output data type. Moreover, the systems and methods for web data transformation as disclosed herein are capable of generating and applying a cost function to a set of multiple/different web source linking solutions to evaluate which web source linking solution provides either an overall superior cost, or a superior cost with regard to one or more specific cost parameters.

Thus, the systems and methods for web data transformation as disclosed herein provide for discovery of a preferred web source, i.e., API, given a data type (either input or output) and exploration of a universe of available web sources and associated data types. Additionally, the systems and methods for web data transformation as disclosed herein enables developers to uncover how to connect web sources, i.e., APIs, that can be linked to move, i.e., transform, from one type of data to another.

In one embodiment, the system is implemented as an API search engine which operates to perform the following tasks, among others:

Task 1: take one or more input data type(s) as an input, and provide available output data type transforms, wherein the available output data type transforms operate to transform the input data type(s) into one or more output data type(s), Task 2: take one or more output data type(s) as an input, and provide available input data type transforms, wherein the available input data type transforms operate to transform one or more input data type(s) into the output data type(s), and Task 3: take both input data type(s) and output data type(s) as inputs, and provide one or more transforms that operate to transform the input data type(s) into the output data type(s).

In Task 1 above, where no "output" data type is supplied, the API search engine will return a set of possible output data types that can be generated based on the supplied input data type, as well as the identities and locations of APIs that can transform the supplied input data type into the various possible output data types. In Task 2 above, where no "input" data type is supplied, the API search engine will return a set of possible input data types that can produce the supplied output data type when transformed by discovered APIs, as well as the identities and locations of the discovered APIs.

In Task 3 above, the API search engine investigates all known APIs and web sources and returns a transformation solution that accepts the supplied original input data type and transforms the original input data type into the supplied ultimate output data type. The transformation solution may be a single discovered API, or may be multiple APIs that are linked with each other on an output-to-input basis. Specifically, if the requested data type transformation (original input data type-to-ultimate output data type) is not available through a single API, but can be achieved by combining/linking multiple APIs, the API search engine is defined to discover the required APIs and combine/link those APIs to arrive at the requested data type transformation.

With regard to Task 3, consider an example in which a developer, e.g., programmer, is looking for a mechanism to get a user's location based on an internet protocol (IP) address. In this example, the developer supplies the API search engine with an original input data type of IP address, and an ultimate output data type of location. The API search engine then operates to return a number of APIs that can be used to obtain location data type information corresponding to IP address data type information.

With regard to Task 3, consider another example in which a developer is looking for photos at a specific location. In this example, the API search engine return a list of transformation solutions which provide photos at a specific location. Some of the returned transformation solutions may be standalone, i.e., from a single source, APIs and/or web services (for example, Flickr Geotagging), and others of the returned transformation solutions may be combinations of two or more APIs and/or web services. It should be understood that the ability to combine multiple APIs and/or web services to provide a transformation solution serves to expand accuracy and depth of available data type transformations. For example, consider that the developer requests a transformation solution to obtain geotagged photos with a Wikipedia citation. In this example, there is no API available from a single source to provide the requested transformation solution. In this example, the API search engine locates a number of APIs that can be linked output-to-input to provide the requested transformation solution. The API search engine is capable of storing this developed transformation solution as a new API for future reference and use.

FIG. 1 shows a method for generating a directory of web sources available for use by the API search engine, in accordance with one embodiment of the present invention. The method includes an operation 101 in which the API search engine automatically crawls the web searching for API definitions. In an operation 103, the API search engine discovers an API definition. In an operation 105, the API search engine stores the input and output data types of the discovered API definition and the data type transformations performed by the discovered API definition in the directory of web sources.

In one embodiment, an operation can be performed to check the directory of web sources for the existence of the discovered API definition to avoid inclusion of duplicate API definitions in the directory of web sources. In another embodiment, every discovered API definition is included in the directory of web sources regardless of whether or not an API definition of the same identity is already stored in the directory of web sources, thereby enabling storage of different variations of the same API definition.

Additionally, in an operation 107, the API search engine is provided with an API definition. Then, the operation 105 is performed to store the input and output data types of the provided API definition and the data type transformations performed by the provided API definition in the directory of web sources. It should be understood that as the directory of web sources grows, the API search engine can quickly search through the directory for available transformation solutions prior to searching the web for additional APIs and/or web services. Also, it should be understood that as the API search engine is used to find requested transformation solutions in accordance with either of Tasks 1-3, as discussed above, the API search engine can also operate to perform the method for generating the directory of web sources of FIG. 1 as a background operation, thereby providing for continued expansion and development of the directory of web sources.

Figure 2:
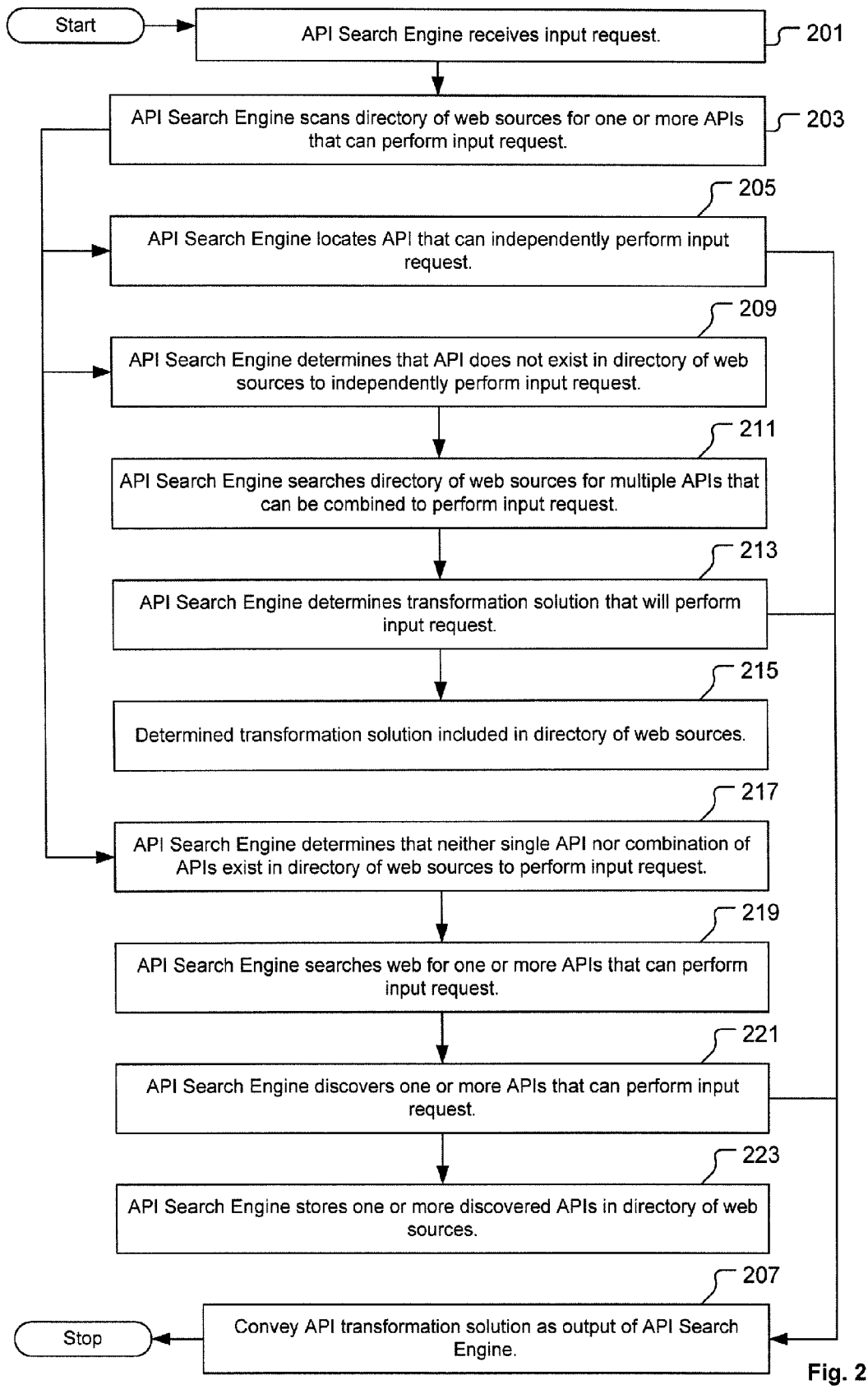
FIG. 2 is an illustration showing a flowchart of a method for operating an API search engine, in accordance with one embodiment of the present invention.

FIG. 2 is an illustration showing a flowchart of a method for operating an API search engine, in accordance with one embodiment of the present invention. The method includes an operation 201 in which the API search engine receives an input request specifying one or more input data types and/or one or more output data types, depending on which of Tasks 1-3, as discussed above, is to be performed. In an operation 203, the API search engine scans a directory of web sources, generated in accordance with the method of FIG. 1, for one or more APIs that can operate on the data types specified in the input request and/or perform the data type transformation specified in the input request. In an operation 205, the API search engine locates one or more APIs within the directory of web sources that can each independently perform the input request. Then, in an operation 207, the API search engine conveys the one or more located APIs as an output to be consumed by a user of the API search engine. It should be understood that the user of the API search engine can be either a person or a virtual entity, such as an application executing on a computer system.

The method also includes an operation 209 in which the API search engine determines that an API does not exist within the directory of web sources that can independently perform the input request. From the operation 209, the method proceeds with an operation 211 to search the directory of web sources for multiple APIs that can be combined to perform the input request. In an operation 213, the API search engine determines a transformation solution that combines multiple APIs listed within the directory of web sources to perform the input request. The method proceeds from operation 213 to operation 207, in which the API search engine conveys the determined transformation solution as an output to be consumed by a user of the API search engine. Also, following operation 213, the method includes an operation 215 in which the determined transformation solution is included as a new API in the directory of web sources. This new API references the multiple APIs and their specific combination as determined in the transformation solution, and can be indexed by its originating input data types, its ultimate output data types, the data type transformation it performs, or any combination thereof.

The method also includes an operation 217 in which the API search engine determines that neither a single API nor a combination of multiple APIs exists within the directory of web sources that can perform the input request. From the operation 217, the method proceeds with an operation 219 in which the API search engine searches the web for one or more APIs that can be utilized to perform the input request. In an operation 221, the API search engine discovers one or more API definitions on the web that can perform the input request. In an operation 223, the API search engine stores the input and output data types of the one or more discovered API definitions and the data type transformations performed by the discovered API definition in the directory of web sources. From the operation 223, the method proceeds to operation 207 in which the API search engine conveys the determined transformation solution as an output to be consumed by a user of the API search engine. If the API search engine is unable to find a transformation solution to satisfy the input request within an allowed time period or within allowed data transmission limit, the API search engine operates to communicate the failed search status to the user of the API search engine. In one embodiment, the API search engine may determine a modified version of the input request that can be performed by available APIs. In this embodiment, the API search engine may communicate the modified version of the input request as a suggestion in conjunction with communicating the failed search status to the user of the API search engine.

Figure 3:
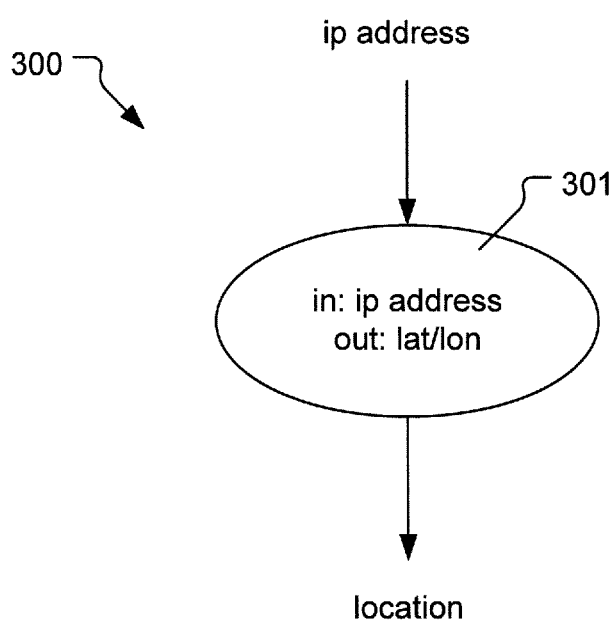
FIG. 3 shows a portion of a directed graph for the example in which a single API is found to take an ip address as an input and generate corresponding lat/lon coordinates as an output, in accordance with one embodiment of the present invention.

In one example, consider that a programmer is looking for a geographical location of an ip address. In this example, the programmer utilizes the API search engine to find a transformation solution by specifying the original input data type as "ip address", and the ultimate output data type as "lat/lon coordinates." The API search engine then operates to find one or more APIs that take an ip address as an input and generate corresponding lat/lon coordinates as an output. FIG. 3 shows a portion of a directed graph 300 for the example in which a single API 301 is found to take an ip address as an input and generate corresponding lat/lon coordinates as an output, in accordance with one embodiment of the present invention.

Figure 4:
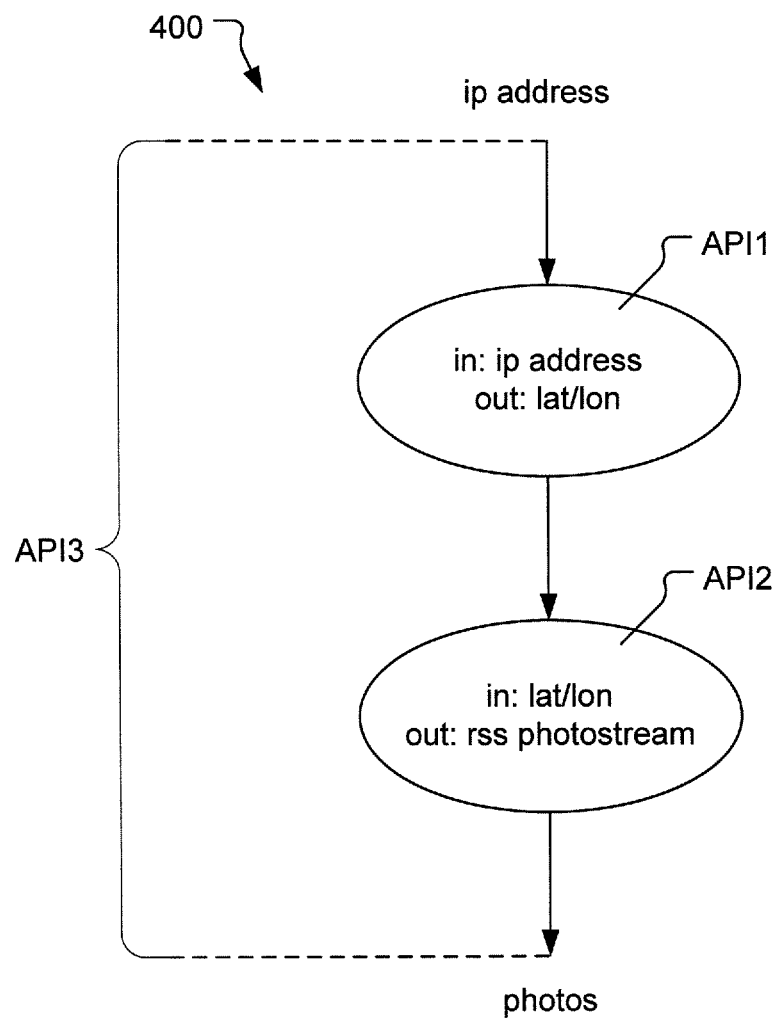
FIG. 4 shows a portion of a directed graph for the example in which multiple APIs are required to transform an ip address into corresponding photos, in accordance with one embodiment of the present invention.

In another example, consider that a programmer is looking for photos taken at a particular ip address. In this example, the programmer utilizes the API search engine to find a transformation solution by specifying the original input data type as "ip address", and the ultimate output data type as "photos." The API search engine then operates to find one or more APIs that take an ip address as an input and provide corresponding photos as an output. FIG. 4 shows a portion of a directed graph 400 for the example in which multiple APIs are required to transform an ip address into corresponding photos, in accordance with one embodiment of the present invention. According to the directed graph 400, the API search engine locates an API1 that takes an ip address input data type and provides latitude and longitude (lat/lon) coordinates as an output data type. The API search engine also locates an API2 that takes lat/lon coordinates as an input data type and provides an rss photostream output data type. The API search engine operates to combine, i.e., link, API1 and API2 to create a new API3, which accesses API1 and API2 in sequence in order to output photos corresponding to a specified ip address. The new API3 can be stored in a directory of web sources along with API1 and API2.

Figure 5:
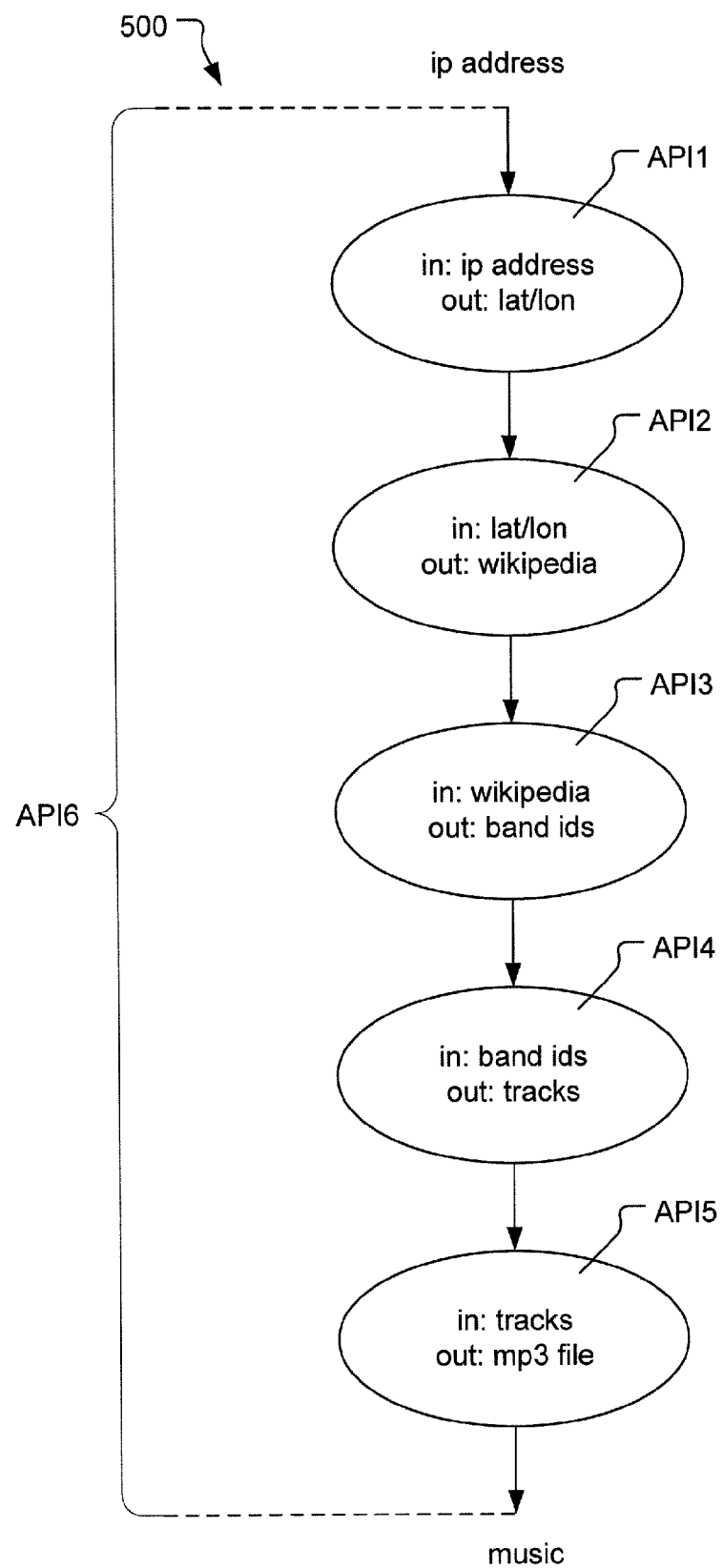
FIG. 5 shows a portion of a directed graph for the example in which multiple APIs are required to transform an ip address into corresponding music, in accordance with one embodiment of the present invention.

In another example, consider that a programmer is looking for music played at a particular ip address. In this example, the programmer utilizes the API search engine to find a transformation solution by specifying the original input data type as "ip address", and the ultimate output data type as "music." The API search engine then operates to find one or more APIs that take an ip address as an input and provide corresponding music as an output. FIG. 5 shows a portion of a directed graph 500 for the example in which multiple APIs are required to transform an ip address into corresponding music, in accordance with one embodiment of the present invention. According to the directed graph 500, the API search engine locates an API1 that takes an ip address input data type and provides latitude and longitude (lat/lon) coordinates as an output data type. The API search engine also locates an API2 that takes lat/lon coordinates as an input data type and provides a wikipedia reference as an output data type. The API search engine also locates an API3 that takes a wikipedia reference as an input data type and provides band identifiers as an output data type. The API search engine also locates an API4 that takes a band identifier as an input data type and provides corresponding music track identifiers as an output data type. The API search engine also locates an API5 that takes a music track identifier as an input data type and provides a corresponding mp3 file as an output data type. The API search engine operates to combine, i.e., link, API1 through API5 to create a new API6, which accesses API1 through API5 in sequence in order to output music corresponding to a specified ip address. The new API6 can be stored in a directory of web sources along with each of API1 through API5.

Figure 6:
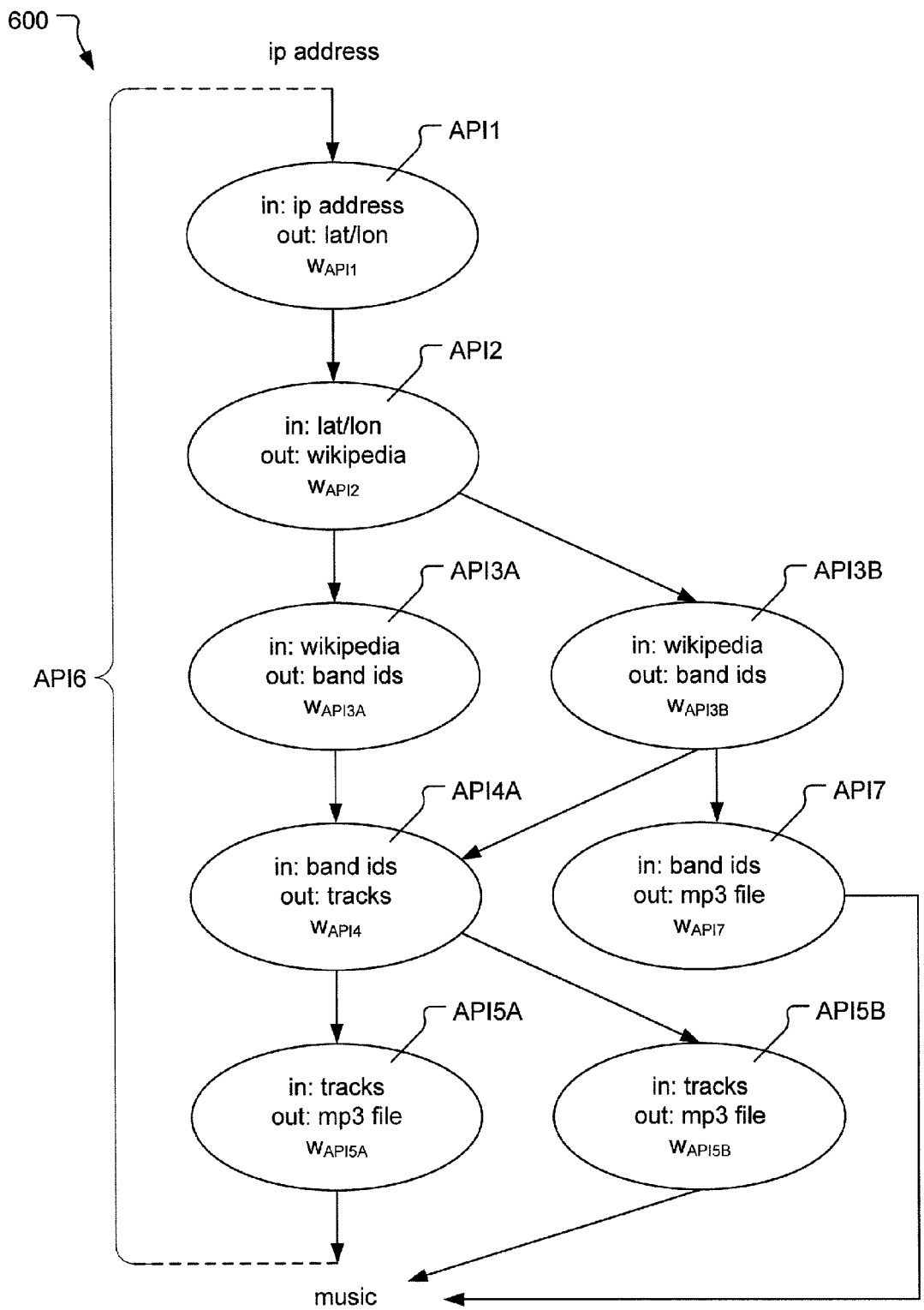
FIG. 6 shows a directed graph, which is a variation of FIG. 5, in which five different paths exist to transform an ip address into corresponding music, in accordance with one embodiment of the present invention.

The API search engine is also capable of implementing a cost function to determine which paths through a given directed graph are more expensive than others with regard to various cost parameters. For example, FIG. 6 shows a directed graph 600, which is a variation of FIG. 5, in which two APIs (API3A and API3B) exist to transform wikipedia input into band identifier output, and in which two APIs (API5A and API5B) exist to transform track input into mp3 file output, and in which one API (API7) exists to transform band identifier input into mp3 file output. According to the directed graph 600, there are five separate paths that can be taken to transform the original input data type ip address into the ultimate output data type music. Specifically, the five paths include: 1) APIs 1, 2, 3A, 4, 5A; 2) APIs 1, 2, 3A, 4, 5B; 3) APIs 1, 2, 3B, 4, 5A; 4) APIs 1, 2, 3B, 4, 5B; and 5) APIs 1, 2, 3B, 7. A cost function is applied to the directed graph by determining a weighting factor ($w_i$) for each API (i) along a given path in the directed graph 600. The weighting factor ($w_i$) for a given API can be formulated to represent any number of different cost parameters. For example, some cost parameters of interest may include runtime analytics (e.g., latency), developer feedback (e.g., rating score), geographical location, reliability, availability of developer hints, licensing issues, among others. In one embodiment, the various cost parameters are normalized across the different APIs, such that a particular weighting factor ($w_i$) of a given API (i) is defined fairly relative to other APIs. In one embodiment, each API (i) is assigned a uniform weighting ($w_i$) of 1. In this case, a given path through the directed graph corresponding to a successful transformation solution is weighted by the number of APIs that must be utilized in the given path to perform the transformation solution.

In accordance with the present example, to determine the cost of a given path through the directed graph 600, the weightings of the various APIs along a given path are summed. For example, the cost of path 1 (APIs 1, 2, 3A, 4, 5A) is $w_1+w_2+w_{3A}+w_4+w_{5A}$. Similarly, the cost of path 2 (APIs 1, 2, 3A, 4, 5B) is $w_1+w_2+w_{3A}+w_4+w_{5B}$, and the cost of path 3 (APIs 1, 2, 3B, 4, 5A) is $w_1+w_2+w_{3B}+w_4+w_{5A}$, the cost of path 4 (APIs 1, 2, 3B, 4, 5B) is $w_1+w_2+w_{3B}+w_4+w_{5B}$, and the cost of path 5 (APIs 1, 2, 3B, 7) is $w_1+w_2+w_{3B}+w_7$. Based on the cost function applied, the API search engine can determine the cost of each path through the directed graph for a given transformation solution and determine which path is most cost effective. Also, it should be understood that different paths for a given transformation solution can include a different number of transformations. For example, path 5 in FIG. 6 includes four transformations, whereas paths 1 through 4 each include five transformations. Thus, path 5 provides a shorter path for the transformation solution. It should understood, however, that depending on the APIs involved, a shorter path may or may not correspond to a faster path.

In one embodiment, the user is able to specify as input to the API search engine which cost parameters should be considered in determining the cost function and associated API weightings. In this embodiment, each API listed in the directory of web sources is annotated with a value of each cost parameter that is applicable to the API. The API search engine can then process for each API in the identified transformation solutions, i.e., in the discovered paths through the directed graph, the cost parameters that are of interest, i.e., the cost parameters that are specified in the input to the API search engine to be used. Also, the API search engine can be directed to provide only the least costly transformation solution, or may be directed to provide all identified transformation solutions in order of their respective cost, or may be directed to provide all identified transformation solutions that have a respective cost that is less than an user specified cost threshold value. It should be understood, however, that the API search engine can be directed to provide essentially any result in essentially any form that is capable of being generated through its defined operations.

In one embodiment, the API search engine discussed above can be implemented in conjunction with the Query Language (QL) Web Service which is summarily described below, and which is disclosed in detail in related U.S. patent application Ser. No. 12/607,804, filed on Oct. 28, 2009, and entitled "System for Querying and Consuming Web-Based Data and Associated Methods," which is incorporated herein by reference in its entirety. The QL Web Service utilizes open data tables to bind a web data source with the QL Web Service. An open data table is an independently defined structured file, e.g., XML file, that includes information to bind a given web data source with the QL Web Service and includes information identifying various APIs that accessible at the given web data source, and the input and output data types associated with those various APIs. The open data tables of the QL Web Service provide a mechanism for new data types to be defined by users/developers. Data types themselves may be ad-hoc and defined elsewhere as XML files, or may simply be well-understood labels for input or output data structures, or parts thereof. Therefore, when utilizing the API search engine in conjunction with the QL Web Service, the API search engine can search through available open data tables for APIs or combinations of APIs that can provide the requested original input data type-to-ultimate output data type transformation solution.

Using the QL Web Service and interconnected API search engine, a developer provides the QL Web Service with the input request for the API search engine, and the API search engine will utilize the QL Web Service to search through open data tables for APIs that are usable to perform the input request, and link the discovered APIs through one or more QL Web Service URLs to perform the input request. For example, the developer can provide the API search engine with the original input data type and the ultimate output data type through the QL Web Service interface, and the QL Web Service in conjunction with the API search engine will function to discover the necessary APIs in the available open data tables and link the necessary APIs to generate the ultimate output data type corresponding to the original input data type.

Figure 7:
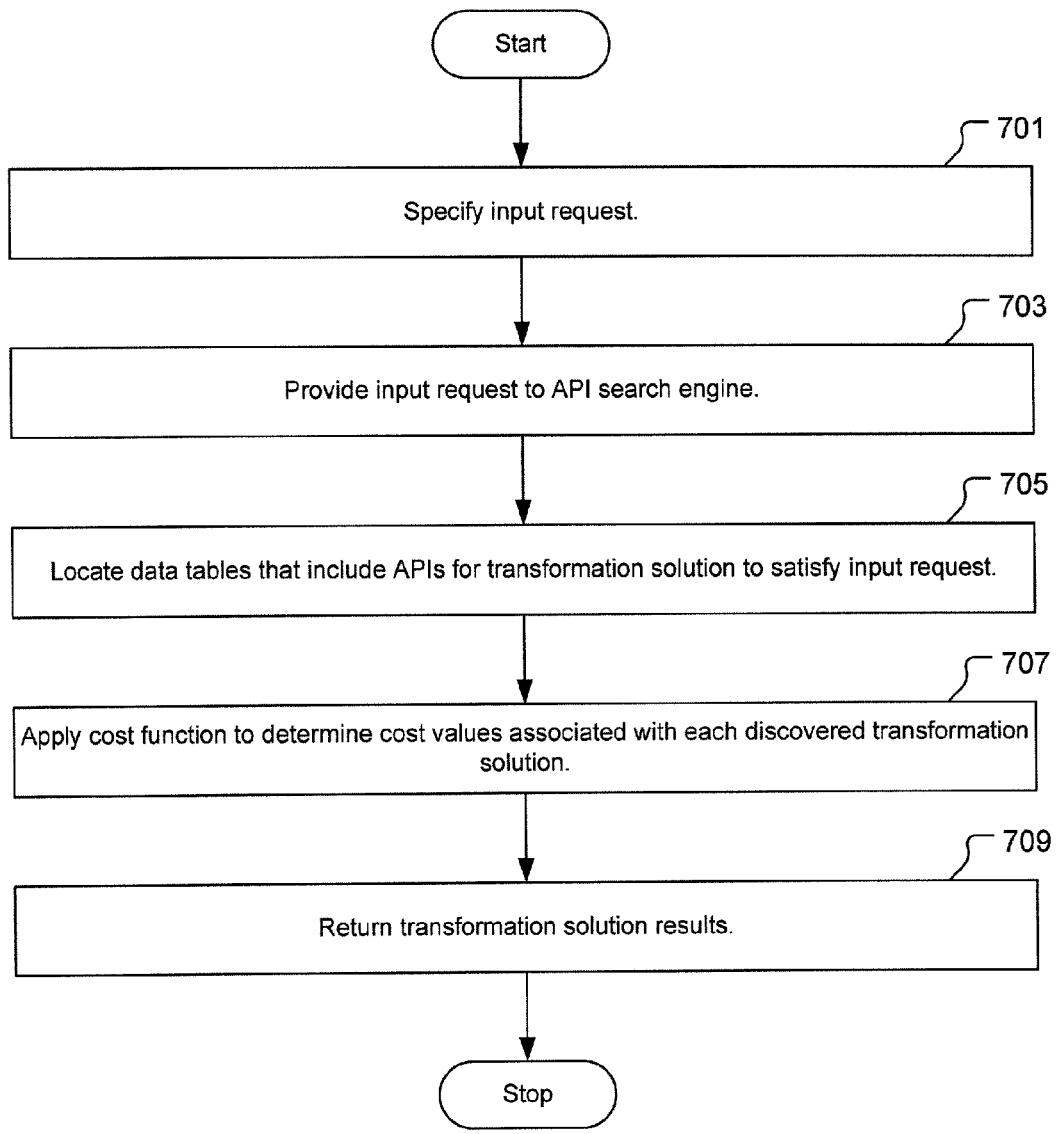
FIG. 7 shows a flowchart of a method for operating the API search engine in conjunction with the QL Web Service, in accordance with one embodiment of the present invention.

FIG. 7 shows a flowchart of a method for operating the API search engine in conjunction with the QL Web Service, in accordance with one embodiment of the present invention. The method includes an operation 701 in which a user of the QL Web Service specifies an input request for the API search engine. The input request can include data type parameters (original input data type(s) and/or ultimate output data type(s)) as discussed above with regard to Tasks 1-3, and can also include other input parameters such as cost function specifications and/or filters and other preferences for returned results. In one embodiment, the user of the QL Web Service specifies the input request for the API search engine through the QL graphical user interface (GUI) as described in detail in related U.S. patent application Ser. No. 12/607,926, filed on Oct. 28, 2009, and entitled "Developer Interface and Associated Methods for System for Querying and Consuming Web-Based Data," which is incorporated herein by reference in its entirety.

The method also includes an operation 703 in which the specified input request is provided to the API search engine. In operation 705, the API search engine operates to locate one or more QL Web Service data tables that include APIs which can be used in a transformation solution to satisfy the specified input request, e.g., which can be used to generate the ultimate output data type(s) from the original input data type (s). The QL Web Service data tables searched by the API search engine can include Internal Yahoo! data tables, Community data tables, Developer's private data tables, or any combination thereof, wherein the Community and Developer's private data tables are specified as open data tables. In one embodiment, operation 705 includes traversal of a directed graph of available open data tables to determine possible transformation solutions. A path through the directed graph corresponds to a transformation solution for the input request. The path through the directed graph also corresponds to a query in the QL Web Service that accesses and links that necessary open data tables to transform the original input data type into the ultimate output data type.

The method can also includes an optional operation 707 to apply a cost function to the directed graph of available open data tables to determine cost values associated with each discovered transformation solution. In one embodiment, the cost function can be user-specified. In one embodiment, the cost function can utilize weighting values for each API as specified in the open data tables that reference the APIs. The method further includes an operation 709 in which the API search engine returns results through the QL web service to the user. The API search engine can return either of the following results:

QL queries associated with generating the ultimate output data type(s) from the original input data type(s), the QL query results may include one or more of the following:
a URL that directs the API search engine to perform the input request search and returns a QL statement representing a transformation solution for the input request,
a URL that directs the API search engine to perform the input request search, and executes a QL statement representing a transformation solution for the input request, and return results of the executed QL statement,
a URL that executes a QL statement representing a transformation solution for the input request, and return results of the executed QL statement, without directing the API search engine to re-perform the input request search;
a request for additional original input data type(s) to enable discovery of a transformation solution;
an error message, e.g., indicating that one or more of the original input data type(s) or one or more of the ultimate output data type(s) are not understood, or indicating that a transformation solution cannot be found, etc.;
an existing QL table that contains a QL query that provides a transformation solution;
a newly created open data table and corresponding QL query that references other open data tables in a linked manner to provide a transformation solution;
an ambiguous result message indicating that there are multiple results with similar costs.

It should be understood that in one embodiment, when a given API or set of APIs is located that provides the ultimate output data type(s) based on the original input data type(s), the API search engine in conjunction with the QL Web Service, provides a query, i.e., QL statement, that specifies the given API or set of APIs to produce the ultimate output data type(s) from the original input data type(s). Also, in one embodiment, when a given API or set of APIs cannot be found to provide the ultimate output data type(s) based on the original input data type(s), the API search engine in conjunction with the QL Web Service determines whether or not one or more additional original input data type parameters and/or ultimate output data type parameters would allow for provision of the ultimate output data type(s) from the original input data type(s). For example, if the original input data type specified (latitude) and the ultimate output data type specified (photos), there may be an API that can provide photos with both a latitude and longitude input, but no API that will provide photos with only a latitude input. In this example, the API search engine in conjunction with the QL Web Service will respond with a request for additional input, effectively indicating that a longitude input is also needed to return photos based on a latitude input.

The user of the API search engine within the QL Web Service should understand how the original input data type(s) and ultimate output data type(s) that they specify in the input request maps to a set of available data type descriptions within the population of open data tables. In one embodiment, to facilitate this understanding, a parameter type hierarchy is developed and stored outside of the open data tables of the QL Web Service. The parameter type hierarchy provides a description of the various input data types and output data types for APIs referenced within each open data table.

Based on the foregoing, it should be appreciated that the systems and methods disclosed herein for web data transformation sourcing, i.e., the API search engine, utilizes metadata associated with APIs to search the space of API directed graphs for transformation solutions between original input data type(s) and ultimate output data type(s). The API search engine provides developers with a tool that efficiently finds code to perform specific data type transformations. The API search engine is capable of creating new APIs that combine and link existing APIs to provide data type transformation solutions that do not independently exist within the population of available APIs. Also, the API search engine is defined to apply a cost function to discovered transformation solutions to assist a developer in evaluating the quality of the transformation solution results. Moreover, the API search engine is capable of automatically creating API mashups, i.e., linked combinations of APIs, across multiple web data sources and providers.

Figure 8:
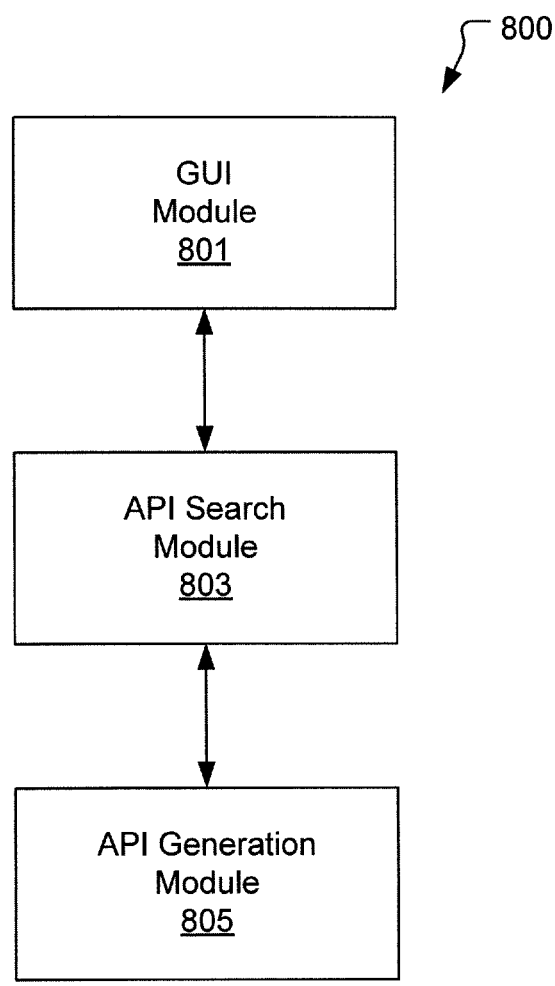
FIG. 8 is an illustration showing a computer-implemented system for web data transformation sourcing, in accordance with one embodiment of the present invention.

FIG. 8 is an illustration showing a computer-implemented system 800 for web data transformation sourcing, in accordance with one embodiment of the present invention. The system 800 includes a graphical user interface (GUI) module 801 defined to receive a set of original input data types and a set of ultimate output data types. The system 800 also includes a search module 803 defined to locate one or more web based sources defined to transform the set of original input data types into the set of ultimate output data types. The search module 803 is further defined to generate a transformation solution that when executed utilizes the one or more located web based sources to transform the set of original input data types into the set of ultimate output data types. The transformation solution is conveyed by the GUI module 801. In one embodiment, the system 800 also includes an API generation module 805 defined to combine multiple API's into single API to perform a particular data type transformation. The multiple API's are located by the search module 803 when it is operated to locate one or more web based sources defined to transform the set of original input data types into the set of ultimate output data types.

The set of original input data types and the set of ultimate output data types correspond to data types known to the one or more located web based sources. The one or more web based sources correspond to respective APIs. Each API is defined to operate on input data corresponding to one or more input data types so as to generate output data corresponding to one or more output data types associated with the one or more input data types. Also, in one embodiment, the transformation solution is defined as a universal resource locator (URL) that references and links the one or more located web based sources.

The search module 803 is further defined to determine that one or more web based sources are not available to transform the set of original input data types into the set of ultimate output data types. In one embodiment, the search module 803 is defined to determine one or more alternate output data types into which the set of original input data types can be transformed by the available web based sources. In this embodiment, the one or more alternate output data types are conveyed by the GUI module 801. Also, in one embodiment, the search module 803 is defined to determine a number of additional input data types that when combined with the set of original input data types will provide for location of one or more web based sources defined to transform the set of original input data types and the number of additional input data types into the set of ultimate output data types. In this embodiment, the number of additional input data types are conveyed by the GUI module 801.

In one embodiment, the search module 803 is defined to generate an index of web based sources as the search module 803 operates to locate one or more web based sources defined to transform the set of original input data types into the set of ultimate output data types. The index of web based sources includes an identifier of each examined web based source and its corresponding input and output data types. In this embodiment, the search module 803 is defined to search the index of web based sources prior to performing a web search to locate one or more web based sources defined to transform the set of original input data types into the set of ultimate output data types.

Also, in one embodiment, the search module 803 is defined to combine multiple web based sources in the transformation solution by automatically supplying the output of some web based sources to the input of other web based sources until the set of ultimate output data types is obtained. In this embodiment, the search module 803 is defined to determine multiple transformation paths by which the set of original input data types is transformed into the set of ultimate output data types. The search module 803 is defined to generate a cost value for each of the multiple transformation paths. Each cost value is generated in accordance with a cost function. The cost function accounts for latency and restrictions associated with each of one or more segments which define a given transformation path.

Figure 9:
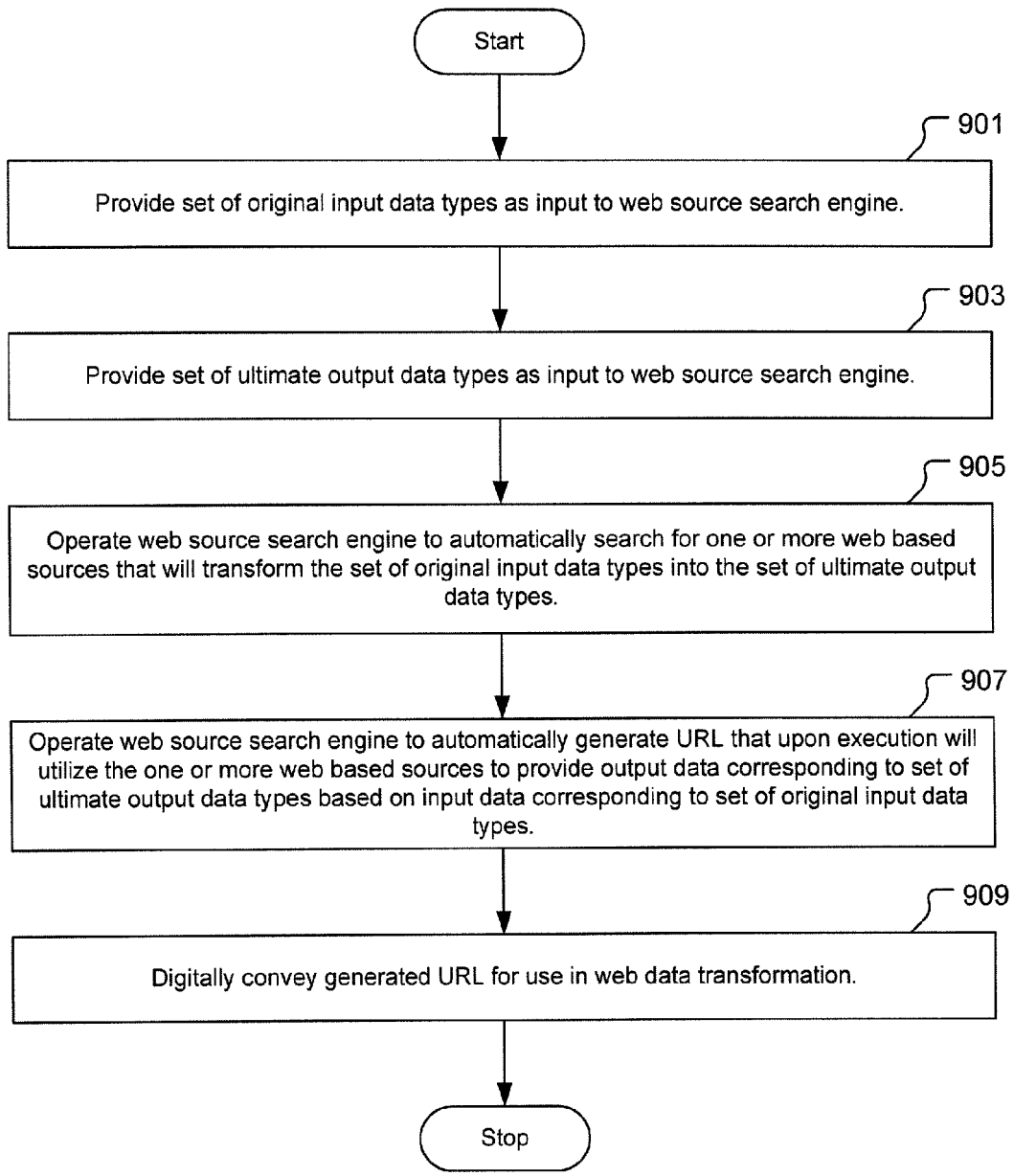
FIG. 9 shows a flowchart of a method for web data transformation sourcing, in accordance with one embodiment of the present invention.

FIG. 9 shows a flowchart of a method for web data transformation sourcing, in accordance with one embodiment of the present invention. The method includes an operation 901 for providing a set of original input data types as input to a web source search engine. The method also includes an operation 903 for providing a set of ultimate output data types as input to the web source search engine. In one embodiment, the set of original input data types and the set of ultimate output data types are respectively obtained from a data type hierarchy. The data type hierarchy includes a description of each data type known within an existing population of web based sources. In an operation 905, the web source search engine is operated to automatically search for one or more web based sources that will transform the set of original input data types into the set of ultimate output data types.

Upon locating the one or more web based sources, the method proceeds with an operation to 907 in which the web source search engine is operated to automatically generate a URL that upon execution will utilize the one or more web based sources to provide output data corresponding to the set of ultimate output data types based on input data corresponding to the set of original input data types. The method further includes an operation 909 for digitally conveying the generated URL for use in web data transformation in which output data corresponding to the set of ultimate output data types is to be generated based on input data corresponding to the set of original input data types.

In one embodiment, if one or more web based sources cannot be located to transform the set of original input data types into the set of ultimate output data types, the method includes operation of the web source search engine to automatically determine an expanded set of original input data types that will provide for location of one or more web based sources defined to transform the expanded set of original input data types into the set of ultimate output data types. The expanded set of original input data types is digitally conveyed. Also, the method includes digital conveyance of the generated URL for use in web data transformation in which output data corresponding to the set of ultimate output data types is to be generated based on input data corresponding to the expanded set of original input data types.

In another embodiment, upon failing to locate one or more web based sources that will transform the set of original input data types into the set of ultimate output data types, the method includes operating the web source search engine to automatically determine one or more alternate output data types into which the set of original input data types can be transformed by the available web based sources. The one or more alternate output data types are digitally conveyed. Also, the method includes digitally conveying the generated URL for use in web data transformation in which output data corresponding to the one or more alternate output data types is to be generated based on input data corresponding to the set of original input data types.

In one embodiment, operation 905 includes operating the web source search engine to determine multiple transformation paths by which the set of original input data types is transformed into the set of ultimate output data types, and operating the web source search engine to generate a cost value for each of the multiple transformation paths. Each cost value is generated in accordance with a cost function. In one embodiment, the cost function accounts for latency and restrictions associated with each of one or more segments which define a given transformation path.

In one embodiment, the method includes generating an index of web based sources as the web source search engine performs operation 905 to automatically search for one or more web based sources that will transform the set of original input data types into the set of ultimate output data types. The index of web based sources includes an identifier of each examined web based source and its corresponding input and output data types. In this embodiment, the web source search engine can be operated to search the index of web based sources for one or more web based sources that will transform the set of original input data types into the set of ultimate output data types.

Additionally, in one embodiment, the method of FIG. 9 is performed within the architecture of the QL Web Service. In this embodiment, the web source search engine is operated to search open data tables that include references to web based sources and associated input and output data types as part of operation 905 in which a search is made for one or more web based sources that will transform the set of original input data types into the set of ultimate output data types. Each open data table is accessible through an associated URL. Also, each open data table includes binding data which binds one or more web data sources referenced within the open data table to the QL Web Service. The binding data includes instructions to the QL Web Service with regard to querying the one or more web data sources for specific data present at the one or more web data sources. It should be appreciated that the QL Web Service is defined to expose a query language for specification of a particular web data source to be queried, data types to be queried within the particular web data source, and one or more operations to be performed on the particular web data source. Also, in this embodiment, the URL generated in operation 907 is defined to be executable through the QL Web Service.

Figure 10:
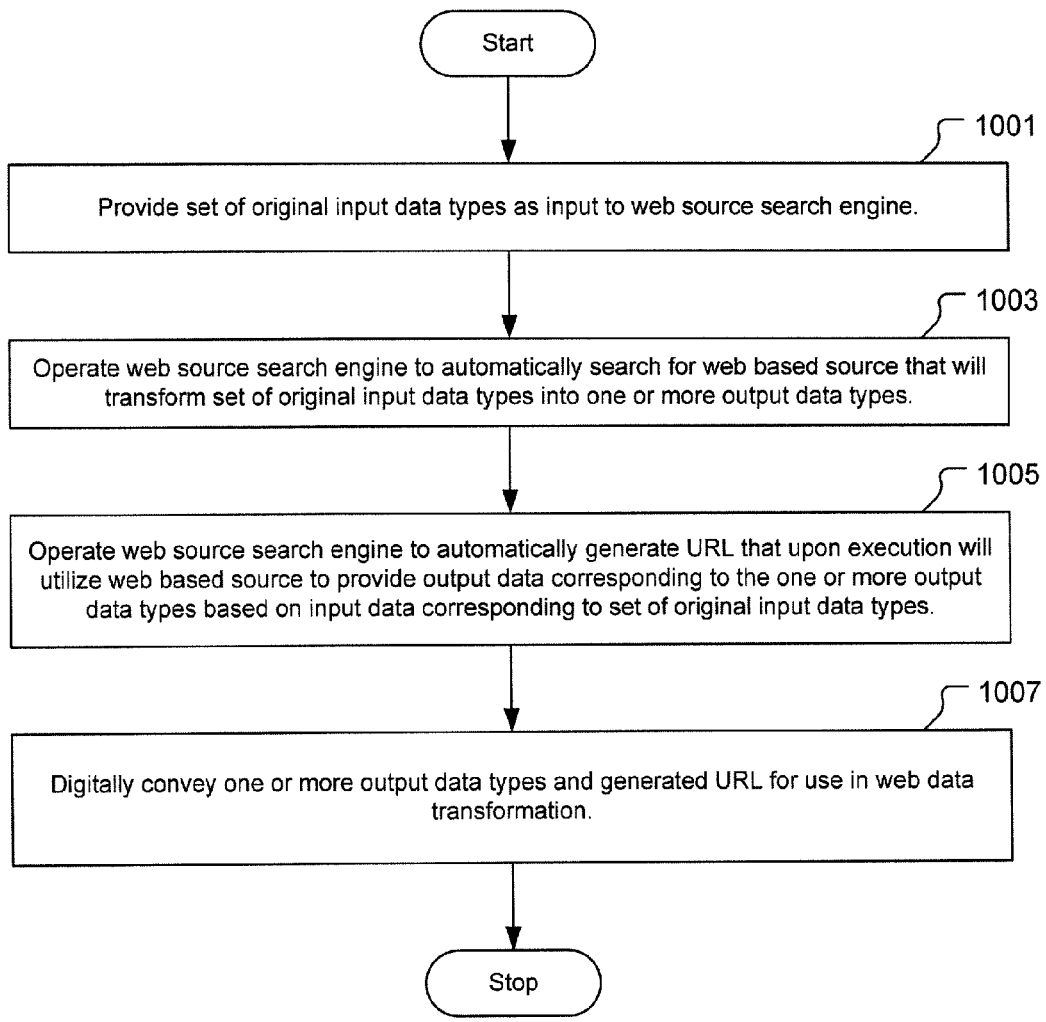
FIG. 10 shows a flowchart of a method for web data transformation sourcing, in accordance with one embodiment of the present invention.

FIG. 10 shows a flowchart of a method for web data transformation sourcing, in accordance with one embodiment of the present invention. The method includes an operation 1001 for providing a set of original input data types as input to a web source search engine. An operation 1003 is then performed to operate the web source search engine to automatically search for a web based source that will transform the set of original input data types into one or more output data types. Upon locating the web based source, the method includes an operation 1005 for operating the web source search engine to automatically generate a URL that upon execution will utilize the web based source to provide output data corresponding to the one or more output data types based on input data corresponding to the set of original input data types. The method further includes an operation 1007 for digitally conveying the one or more output data types and the generated URL for use in web data transformation in which output data corresponding to the one or more output data types is to be generated based on input data corresponding to the set of original input data types.

Figure 11:
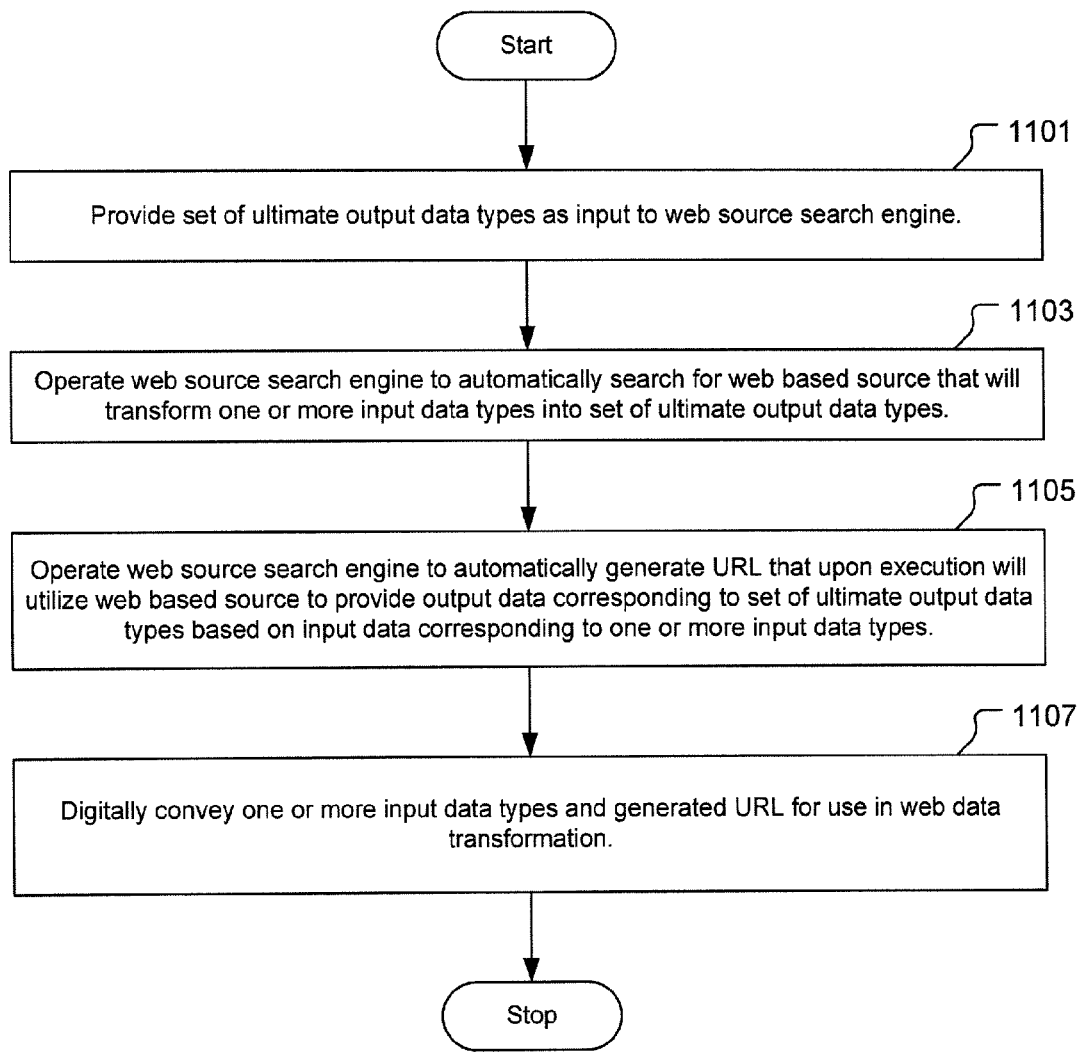
FIG. 11 shows a flowchart of a method for web data transformation sourcing, in accordance with one embodiment of the present invention.

FIG. 11 shows a flowchart of a method for web data transformation sourcing, in accordance with one embodiment of the present invention. The method includes an operation 1101 for providing a set of ultimate output data types as input to a web source search engine. An operation 1103 is then performed to operate the web source search engine to automatically search for a web based source that will transform one or more input data types into the set of ultimate output data types. Upon locating the web based source, an operation 1105 is performed in which the web source search engine is operated to automatically generate a URL that upon execution will utilize the web based source to provide output data corresponding to the set of ultimate output data types based on input data corresponding to the one or more input data types. The method further includes an operation 1107 for digitally conveying the one or more input data types and the generated URL for use in web data transformation in which output data corresponding to the set of ultimate output data types is to be generated based on input data corresponding to the one or more input data types.

Query Language Web Service

A Query Language (QL) Web Service is disclosed in related U.S. patent application Ser. No. 12/607,804, filed on Oct. 28, 2009, entitled "System for Querying and Consuming Web-Based Data and Associated Methods," which is incorporated herein by reference in its entirety. This application is a continuation-in-part application of prior Application No. The QL Web Service enables developers and their applications to query, filter, and combine data from different sources across the Internet. In one embodiment, the QL Web Service is referred to as the Yahoo! Query Language (YQL) Web Service. However, in other embodiments, the QL Web Service can be referred to by other names. It should be understood that the QL Web Service is a web service that is accessible through the Internet via a URL, and that can be interfaced with using a well-defined language to effect acquisition and consumption of data from one or more web services and/or web data sources.

The QL Web Service operates within a system that includes: 1) the QL Web Service, 2) one or more back-end web data sources/services, and 3) one or more QL tables respectively associated with the one or more back-end web data sources/services. The back-end web data sources/services represent entities that exist in the Internet realm that contain data of interest of various types and that are accessible through the Internet via a URL. For ease of discussion, the back-end web data sources/services are referred to hereafter as web data sources. It should be understood, however, that the term web data source as used herein refers to either data or a service that is accessible through the Internet via a URL.

The QL table is a file which includes information that can be read and understood by the QL Web Service to inform the QL Web Service on how to access and interact with a particular web data source for which the QL table is defined. The QL table serves as a mediator and interpreter between the QL Web Service and the particular web data source for which the QL table is defined. It should be understood that the QL Web Service relies upon the QL table to provide information regarding how to access a web data source, what data is available at the web data source and the data format(s), how to get data from the web data source, and how to manipulate data at the web data source. Therefore, the QL Web Service itself is not hard-coded with knowledge about any particular web data source, but rather the QL Web Service is defined to obtain and understand information from a mediating QL table with regard to interfacing and interacting with a particular web data source. Also, it should be understood that the data that is obtained by the QL Web Service is actually obtained from the back-end web data source, and the QL table provides the binding between the QL Web Service and back-end data source that enables that data to be obtained.

Each QL table for a given web data source is defined in a format that is understood by the QL Web Service. In one embodiment, QL tables are defined in an XML format. However, it should be understood that in other embodiments, the QL tables can be defined in different formats, so long as the QL Web Service is capable of understanding the information contained within the QL tables. The web data sources that are accessed by the QL Web Service can be defined in essentially any format. The binding provided by the QL table between the QL Web Service and a particular web data source informs the QL Web Service as to what type(s) of data are present within the particular web data source. Using the binding information gleaned from the QL table, the QL Web Service knows how to access the data present at the particular web data source in its native format. Once the QL Web Service accesses and retrieves the data from the web data source in its native format, the QL Web Service converts the retrieved data into an internal format for processing within the QL Web Service. In one embodiment, the internal format is an XML format. However, it should be understood that is other embodiments, the QL Web Service can be defined to use any one of a number of different internal formats.

Based on user-specified controls and parameters, the QL Web Service is defined to generate a set of results data from the various data that is retrieved from the one or more back-end web data sources. The QL Web Service is defined to convey the set of results data in either of multiple output formats as specified by the user of the QL Web Service. Specifically, the QL Web Service is defined to convert the set of results data from the internal format used by the QL Web Service into a user-specified output format. In one embodiment, the user-specified output format is either an XML format or a JSON format. However, it should be understood that in other embodiments the QL Web Service can be defined to convey the set of results data in essentially any known output format, as selected by the user of the QL Web Service.

It should be understood and appreciated that a user of the QL Web Service does not need to know either the URLs of any web data source to be accessed or the complexities associated with calling the URLs of any web data source. Each QL table that is associated with a particular web data source provides the knowledge to the QL Web Service regarding the URLs of the particular web data source and the complexities associated with calling the URLs of the particular web data source. The QL Web Service in turn abstracts this detailed and complex information regarding the particular web data sources URLs to the user of the QL Web Service. More specifically, the QL exposed by the QL Web Service allows the user to specify in a single statement one or more QL tables to be operated upon, one or more parameters to be operated upon within the specified QL table(s), and one or more operations to be performed on the specified parameter(s). It should be appreciated that the user does not need to know anything about the URLs that are associated with the web data sources represented by the one or more QL tables.

Additionally, the QL Web Service provides for joining of data from different web data sources, regardless of ownership of the different web data sources, and regardless of how the different web data sources are provisioned and made accessible through the Internet. The web data sources that can be accessed by the QL Web Service, by way of appropriately defined QL tables, can be owned by any entity, can be located anywhere in the world, and can include data of any type. Thus, the QL Web Service provides for joining web data sources together, regardless of their diversity in ownership, location, and/or format, to produce a combined set of results data.

The QL Web Service query language (QL) includes a number of different statements that can be submitted through an appropriately formatted URL to the QL Web Service to access one or more data sources on the Internet, acquire data from the data source, transform the acquired data, and output the set of results data in a selected format, such as XML or JSON format. The QL Web Service can access essentially any type of data source, including but not limited to Yahoo! Web Services, other web services, and web content in formats such as HTML, XML, JSON, RSS, Atom, and microformat, among others.

The QL Web Service is accessed through a URL which is defined to include a QL statement for acquiring and/or manipulating data at one or more web data sources. It should be understood that the provider of data at a web data source may implement some type of protection on the data such that authorization of some sort is required to access the data. If a web data source is protected, the QL table associated with the web data source is defined to specify the type of protection implemented and the requirements for accessing the web data source. Then, the user of the QL Web Service, having seen the QL table description, will know that appropriate credentials must be provided to access the web data source.

FIG. 12 shows a table of query parameters [query_params] for the URLs of the QL Web Service, in accordance with one embodiment of the present invention. It should be understood that the QL Web Service is not limited to the query parameters shown in FIG. 12. Other embodiments of the QL Web Service may include additional query parameters that are not shown in FIG. 12.

FIG. 13 shows a table of QL statements that can be submitted to the QL Web Service via the query parameter [q=] in the URL of the QL Web Service, in accordance with one embodiment of the present invention. It should be understood that the QL statements are not limited those shown in FIG. 13. Other embodiments of the QL Web Service may provide for use of additional QL statements that are not shown in FIG. 13.

As indicated in FIG. 13, the QL statements operate on QL tables. As discussed above, the QL table is a file which includes information that can be read and understood by the QL Web Service to inform the QL Web Service on how to access and interact with a particular web data source. The web data source for which the QL table is defined often contains very large collections of structured data. The Yahoo! QL Web Service includes an extensive list of built-in QL tables that cover a wide range of Yahoo! Web Services and access to off-network data. Additionally, the QL Web Service provides for creation and use of QL Open Data Tables to bind any web data source to the QL Web Service, thereby enabling access to and consumption of the web data source through the QL Web Service.

It should be understood that a QL table referenced herein may be either a private QL table or a public QL table depending on the web data source with which it is associated. However, regardless of the whether the QL table is public or private, the QL Web Service is defined to utilize the QL table in the same manner such that the QL table serves as a mediator between the QL Web Service and the associated web data source.

The QL statements of FIG. 13 can be run in several ways. In one embodiment, the QL statements can be run in a Yahoo! QL Console, which is a QL Web Service user interface that is executable within a web browser. The Yahoo! QL Console is described in related U.S. patent application Ser. No. 12/607,926, filed on Oct. 28, 2009, and entitled "Developer Interface and Associated Methods for System for Querying and Consuming Web-Based Data," which is incorporated herein by reference in its entirety.

In another embodiment, a web application can use an HTTP request, such as an HTTP GET request for example, when running SELECT statements, wherein the QL statement is specified as a query parameter of the QL Web Service URL. In one embodiment, a web application can use an HTTP GET, PUT, or DELETE request for the QL statements INSERT, UPDATE, and DELETE, respectively. In yet another embodiment, a web application that uses the PHP SDK can call a query method of the YahooSession class.

QL Statement: SELECT

The SELECT statement of QL retrieves data from one or more QL tables which reference respective web data sources. The QL Web Service fetches data from a back-end web data source, transforms the data as directed, and outputs the data in a specified format. In one embodiment, the specified output format is either XML or JSON format. In this embodiment, output data is presented in a tabular arrangement in which table rows are represented as repeating XML elements or JSON objects, and table columns are XML sub-elements or attributes, or JSON name-value pairs. It should be understood, however, that in other embodiments the QL Web Service can be defined to output results in essentially any format.

The QL SELECT statement has the following syntax:
SELECT what FROM table WHERE filter [|function]

The what clause contains the data fields to retrieve. The data fields correspond to the XML elements or JSON objects that will be conveyed in the output data returned by the QL Web Service based on execution of the SELECT statement. Therefore, the data fields in the what clause represent the columns in the tabular arrangement of output results returned by the QL Web Service. An asterisk (*) in the what clause means all data fields. The table parameter is a QL table (either a QL pre-defined, i.e., built-in, table or a QL Open Data Table) that binds a web data source to the QL Web Service. The filter parameter is a comparison expression that determines which data rows are returned in the output data by the SELECT statement. Thus, the filter represents the rows in the tabular arrangement of output results returned by the QL Web Service. The output data results of the SELECT statement can be piped, via the pipe symbol ("|"), to an optional function, such as a sort function. In one embodiment of QL, statement keywords such as SELECT and WHERE are case-insensitive. However, table and field names are case sensitive. In string comparisons, the values are case sensitive. String literals are enclosed in quotes. Either double or single quotes are allowed.

It is possible to join data from different web data sources by specifying their respective QL tables using a sub-select form of the QL statement. As previously mentioned, the QL Web Service provides for joining of data from different web data sources, regardless of ownership of the different web data sources, and regardless of how the different web data sources are provisioned and made accessible through the Internet. The web data sources that can be accessed by the QL Web Service, by way of appropriately defined QL tables as specified in a sub-select form of the QL statement, can be owned by any entity, can be located anywhere in the world, and can include data of any type. Thus, the sub-select feature of the QL Web Service provides for joining web data sources together, regardless of their diversity in ownership, location, and/or format, to produce a combined set of results data.

The sub-select provides input for the IN operator of the outer SELECT statement. The values in the outer SELECT statement can be either input keys known to the back-end web data source (remote filters) or data fields known to the QL Web Service by way of their definition in the QL table (local filters). For example, by using a sub-select, the following QL statement returns the profiles of all of the connections (friends) of the user currently logged in to Yahoo!:
select * from social.profile where guid in (select guid from social.connections where owner_guid=me)

In the example above, the QL statement joins the social.profile and social.connection QL tables on the values of the GUIDs. More specifically, the inner SELECT, which follows the word IN, returns the GUIDs for the user's connections. For each of these GUIDs, the outer SELECT returns the profile information.

QL tables can also be joined on multiple keys. In the following example, the local.search and geo.places tables are joined on two keys:
select * from local.search where (latitude,longitude) in (select centroid.latitude, centroid.longitude from geo.places where text="north beach, san francisco") and radius=1 and query="pizza" and location=" "

In the above example, the inner SELECT returns two data fields (centroid.latitude and centroid.longitude) which are compared with the two input keys (latitude and longitude) of the outer SELECT.

If a URL for a call to the QL Web Service contains @var literals, the QL Web Service replaces the literals with the values of query parameters with the same names. For example, suppose that the URL for the call to the QL Web Service has the animal query parameter:
http://query.yahooapis.com/v1/yq1?animal=dog&q=select * from sometable where animal=@animal For the above example URL, the QL Web Service will run the following SELECT statement:
select * from sometable where animal="dog"

OL Statement Output Data

In one embodiment, the QL Web Service can return, i.e., output, data in either XML, JSON, or JSONP format. However, it should be understood that in other embodiments the QL Web Service can be extended to return data in essentially any format. In one embodiment, the default format is XML. The format of the output data conveyed by the QL Web Service is not dependent on the data format at the back-end web data source. For example, if a back-end web data source expresses its data in XML format, the QL Web Service is not restricted to conveying the data acquired therefrom in XML format. For example, in this case the QL Web Service can return output data in JSON format or any other format.

In one embodiment, each response from the QL Web Service includes a query element, which contains diagnostics and results elements. Repeating elements within results element correspond to "rows" from a QL table. The attributes of the query element and the sub-elements of the diagnostics element in the output data generated by execution of a given QL statement can be examined to get information about the execution of the given QL statement. The diagnostics element in the output data includes information about the calls the QL Web Service made to the back-end web data sources.

FIG. 14 shows the basic structure of the XML formatted output data in the response generated by a call to the QL Web Service, in accordance with one embodiment of the present invention. FIG. 15 shows the basic structure of the JSON formatted output data in the response generated by a call to the QL Web Service, in accordance with one embodiment of the present invention.

QL Tables

The QL Web Service includes an extensive list of built-in QL tables for use that cover a wide range of Yahoo! Web services and access to off-network data. A listing of the built-in QL tables can be obtained by running the QL statement SHOW TABLES. A description of any QL table can be obtained by running the QL statement DESC table, where table is the name or URL of the QL table to be described.

Additionally, the QL Web Service provides for creation and use of QL Open Data Tables, thereby enabling the QL Web Service to bind with any web data source through the QL language. A QL Open Data Table definition is an independently defined structured file, e.g., XML file, that contains at least the following information to enable binding of the associated web data source with the QL Web Service:

Authentication and Security Options: Specifies the kind of authentication required for incoming requests from the QL Web Service. Specifies whether or not incoming connections from the QL Web Service are required to be made over a secure socket layer (via HTTPS).

Sample Query: A sample query that developers can run via the QL Web Service to get information back from the web data source connection.

QL Data Structure: Instructions on how the QL Web Service should create URLs that access the data available from the web data source connection. A QL Open Data Table definition provides the QL Web Service with the URL location of the web data source, along with the individual query parameters (keys) available to the QL Web Service. The QL Data Structure also identifies input and output data types associated with various APIs that are accessible at the web source corresponding to the QL Open Data Table.

Pagination Options: Specifies how the QL Web Service should "page" through results. If the web data source can provide staggered results, paging will allow the QL Web Service to limit the amount of data returned.

The QL Web Service provides the QL USE statement to access external data via QL Open Data Tables. A single QL Open Data Table can be accessed as indicated in the following example QL USE statement:
USE "http://myserver.com/mytables.xml" AS mytable;
SELECT * FROM mytable WHERE ...

In the above QL statement, USE precedes the location of the QL Open Data Table definition, which is then followed by AS and the table name to be associated with the specified QL Open Data Table definition. After the semicolon, the QL statement is formed as discussed above with regard to the QL SELECT statement. In the above example, the QL Web Service fetches the URL indicated by the USE statement and makes it available as a table named mytable in the current request scope. The statements following use can then select or describe the particular table using the name mytable.

Figure 16:
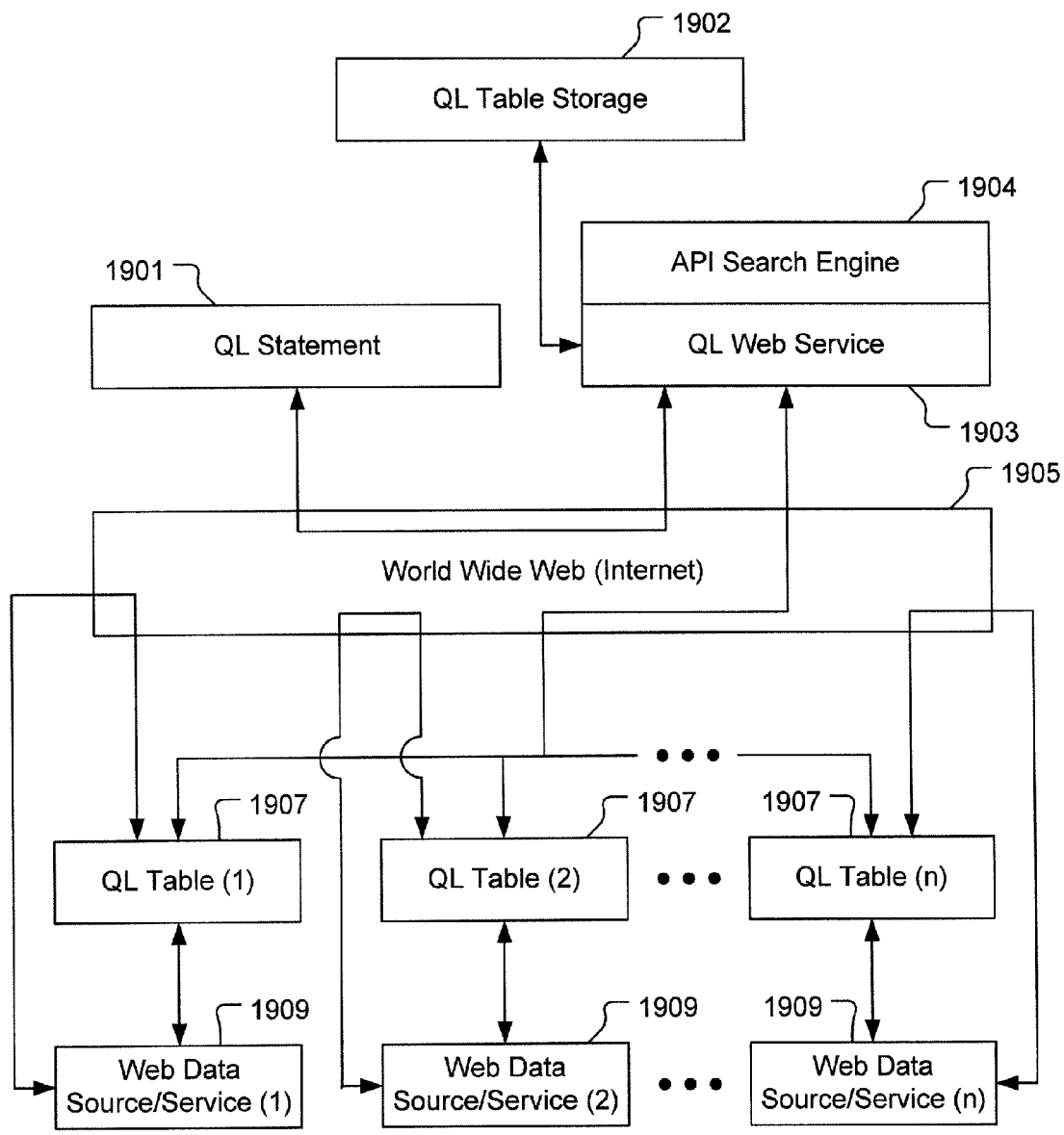
FIG. 16 shows an architectural view of the QL Web Service system, in accordance with one embodiment of the present invention.

FIG. 16 shows an architectural view of the QL Web Service system, in accordance with one embodiment of the present invention. The QL Web Service system architecture includes a QL statement 1901 generated by a developer, i.e., user of the QL Web Service. The QL statement 1901 is described in detail above. The QL statement 1901 is transmitted via the World Wide Web (Internet) 1905 to the QL Web Service 1903, using an appropriate URL entry point to the QL Web Service 1903. As discussed above, the QL Web Service is a system defined to provide a structured interface via the QL to diverse web data sources/services that are accessible through the Internet 1905. By way of the QL, the QL Web Service 1903 operates to abstract the complexities and details associated with varied web data sources/services, such that the developer can use the QL to access and consume data available through the varied web data sources/services without having to know the intricacies associated with accessing and consuming the varied web data sources/services.

The QL Web Service 1903 is defined to process the QL statement 1901 and perform the operations directed by the QL statement 1901, by accessing a URL addressed QL table 1907 via the Internet 1905, or by accessing a QL table stored within a QL table storage 1902, which may be defined as a database in some embodiments. As discussed above, the QL table 1907 is a structured file defined to bind a particular web data source/service 1909 to the QL Web Service 1903. In one embodiment, the web data source/service 1909 can be co-located with its binding QL table 1907. In another embodiment, the web data source/service 1909 can be accessible via the Internet 1905. By way of the QL table 1907, the QL Web Service 1903 is informed as to how the particular web data source/service 1909 can be accessed and consumed, thereby binding the particular web data source/service 1909 to the QL Web Service 1903. Additionally, the API search engine 1904 disclosed herein is defined to interface with the QL Web Service 1903 and function to provide developers with a tool that efficiently finds code to perform specific data type transformations.

Figure 17:
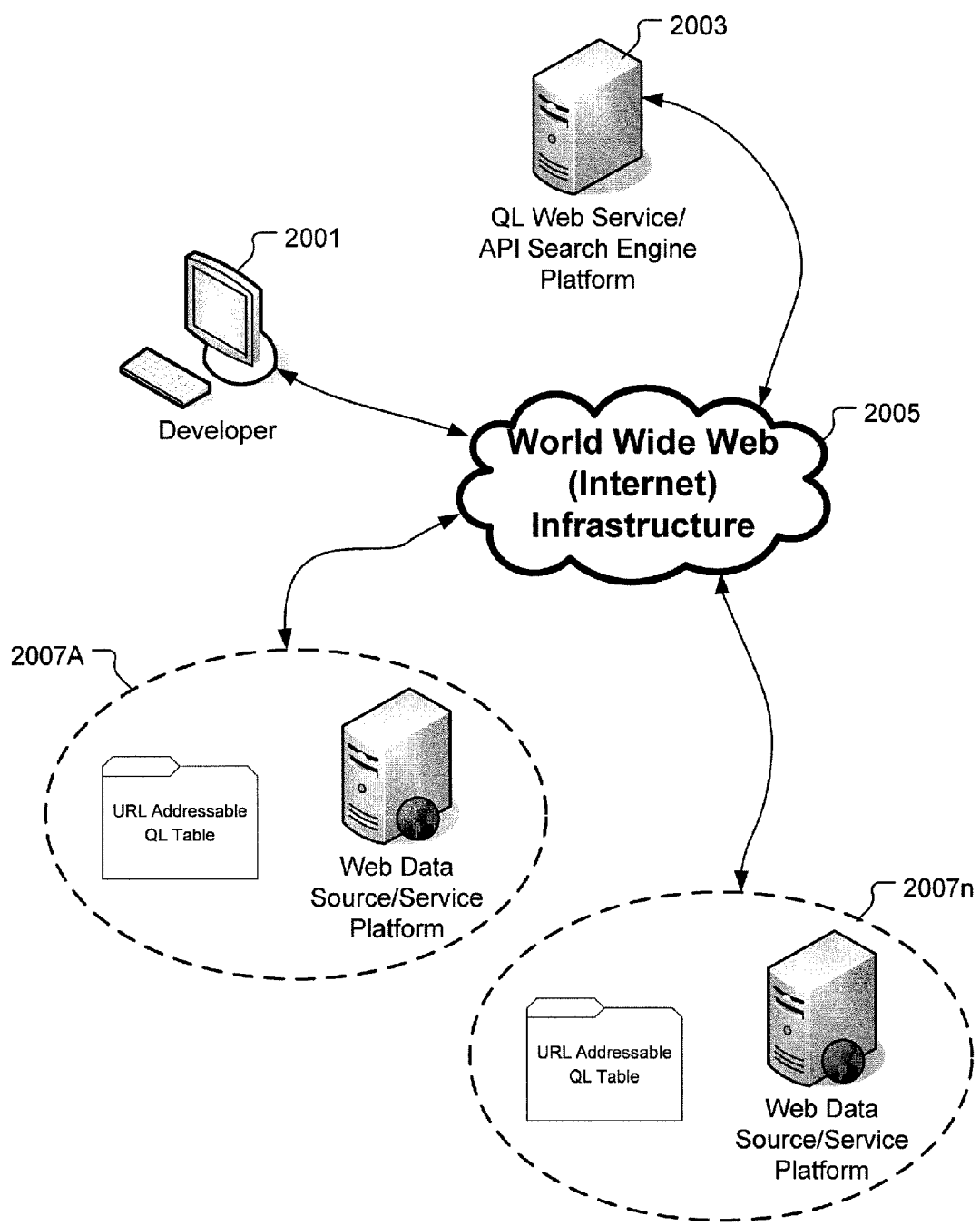
FIG. 17 shows a system level view of the QL Web Service, in accordance with one embodiment of the present invention.

FIG. 17 shows a system level view of the QL Web Service, in accordance with one embodiment of the present invention. Essentially, the system level view of FIG. 17 is a physical representation of the architectural view of the QL Web Service system as described with regard to FIG. 16. The developer creates the QL statement 1901 at a remote terminal 2001. Using a URL to the QL Web Service 1903, the developer's QL statement 1901 is transmitted to the QL Web Service/API search engine platform 2003 via the Internet 1905. It should be understood that the Internet 1905 is defined by an Internet infrastructure 2005 that includes a network of interconnected computer hardware, e.g., switches, routers, servers, cables, transmitters, receivers, etc., and computer software and firmware, which operate in concert to transmit data from node-to-node throughout the universe of computing systems that are connected to the Internet infrastructure 2005, by either wired or wireless means.

The QL Web Service/API search engine platform 2003 is defined to execute the QL Web Service 1903. As such, the QL Web Service/API search engine platform 2003 is defined to connect via the Internet 2005, with any of a number of computing nodes (2007A-2007n) that contains a QL table addressed by a particular URL. Additionally, based on the binding of a web data source/service by the QL table, the QL Web Service/API search engine platform 2003 is defined to connect via the Internet 2005, with any of a number of computing nodes (2007A-2007n) representing the platform that serves the web data source/service associated with the QL table. Through this connection, the QL Web Service 1903 and API search engine 1904 can access and consume the web data source/service associated with the QL table, as requested by the QL statement received at the QL Web Service/API search engine platform 2003 from the developer 2001.

Figure 18:
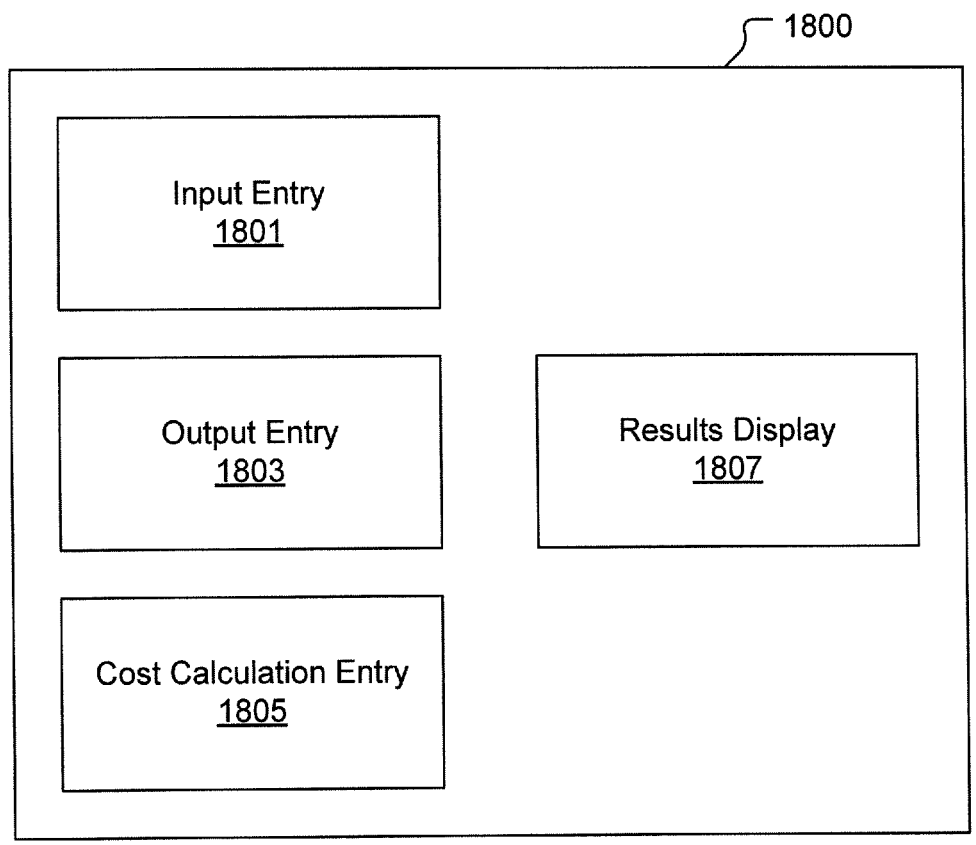
FIG. 18 shows an architecture of an API search engine interface module 1800, in accordance with one embodiment of the present invention.

FIG. 18 shows an architecture of an API search engine interface module 1800, in accordance with one embodiment of the present invention. It should be appreciated that in different embodiments the various components of the API search engine interface module 1800, as shown in FIG. 18 and described herein, can be implemented in essentially any manner so long as the functionality of the various interface module 1800 components is preserved. For example, in various embodiments, the API search engine interface module 1800 can be implemented as a graphical user interface (GUI), or as a web service, or as a command line, which each functions to receive input specifications from an end-user/developer and convey those input specifications to the API search engine.

In the particular embodiment where the API search engine interface module 1800 is defined as a GUI, the API search engine interface module 1800 includes an input entry component 1801, through which a user can specify a set of original input data types. The API search engine interface module 1800 also includes an output entry component 1803, through which a user can specify a set of ultimate output data types. The API search engine interface module 1800 further includes a cost calculation entry component 1805, through which a user can specify any necessary cost calculation parameters to be applied by the API search engine. Additionally, the API search engine interface module 1800 includes a results display component 1807, through which results of the API search engine activity is displayed. In one embodiment, the API search engine results are displayed in a linked format, such that a user can select a given result to obtain further detailed information on the given result. It should be understood that the look and feel of the API search engine GUI can be defined in essentially any manner, so long as the stated functionality is provided.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g. a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium may be any data storage device that can store data, which can thereafter be read by a computer system. Examples of the computer readable medium include hard drives, network attached storage (NAS), read-only memory, random-access memory, FLASH based memory, CD-ROMs, CD-Rs, CD-RWs, DVDs, magnetic tapes, and other optical and non-optical data storage devices. The computer readable medium can also be distributed over a network coupled computer systems so that the computer readable code may be stored and executed in a distributed fashion.

Although the method operations of various embodiments disclosed herein were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overall operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented system for web data transformation sourcing, comprising:
a search module defined to locate one or more web based sources defined to transform a set of original input data types into a set of ultimate output data types, wherein each original input data type in the set of original input data types is a respective structured piece of data that has semantic meaning, and wherein each ultimate output data type in the set of ultimate output data types is a respective structured piece of data that has semantic meaning, the search module defined to determine multiple transformation paths by which the set of original input data types is transformed into the set of ultimate output data types, the search module further defined to generate and digitally convey a transformation solution that when executed utilizes the one or more located web based sources to transform the set of original input data types into the set of ultimate output data types, wherein the search module is defined to generate a cost value for each of the multiple transformation paths, wherein each cost value is generated in accordance with a cost function.

2. The computer-implemented system for web data transformation sourcing as recited in claim 1, wherein the set of original input data types and the set of ultimate output data types correspond to data types known to the one or more located web based sources.

3. The computer-implemented system for web data transformation sourcing as recited in claim 1, wherein the one or more web based sources correspond to respective application programming interfaces (API's), each API defined to operate on input data corresponding to one or more input data types to generate output data corresponding to one or more output data types associated with the one or more input data types.

4. The computer-implemented system for web data transformation sourcing as recited in claim 1, wherein the transformation solution is defined as a universal resource locator (URL) that references and links the one or more located web based sources.

5. The computer-implemented system for web data transformation sourcing as recited in claim 1, wherein the search module is further defined to determine that one or more web based sources are not available to transform the set of original input data types into the set of ultimate output data types.

6. The computer-implemented system for web data transformation sourcing as recited in claim 5, wherein the search module is defined to determine and digitally convey one or more alternate output data types into which the set of original input data types can be transformed by the available web based sources.

7. The computer-implemented system for web data transformation sourcing as recited in claim 5, wherein the search module is defined to determine and digitally convey a number of additional input data types that when combined with the set of original input data types will provide for location of one or more web based sources defined to transform the set of original input data types and the number of additional input data types into the set of ultimate output data types.

8. The computer-implemented system for web data transformation sourcing as recited in claim 1, wherein the search module is defined to combine multiple web based sources in the transformation solution by automatically supplying the output of some web based sources to the input of other web based sources until the set of ultimate output data types is obtained.

9. The computer-implemented system for web data transformation sourcing as recited in claim 1, wherein the search module is defined to generate an index of web based sources as the search module operates to locate one or more web based sources defined to transform the set of original input data types into the set of ultimate output data types, the index of web based sources including an identifier of each examined web based source and its corresponding input and output data types.

10. The computer-implemented system for web data transformation sourcing as recited in claim 9, wherein the search module is defined to search the index of web based sources prior to performing a web search to locate one or more web based sources defined to transform the set of original input data types into the set of ultimate output data types.

11. The computer-implemented system for web data transformation sourcing as recited in claim 1, wherein the cost function accounts for latency and restrictions associated with each of one or more segments which define a given transformation path.

12. The computer-implemented system for web data transformation sourcing as recited in claim 1, further comprising:
an application programming interface (API) generation module defined to combine multiple API's into single API to perform a particular data type transformation, wherein the multiple API's are located by the search module when operated to locate one or more web based sources defined to transform the set of original input data types into the set of ultimate output data types.

13. The computer-implemented system for web data transformation sourcing as recited in claim 1, further comprising:
an interface module defined to receive the set of original input data types and the set of ultimate output data types, wherein an interfacing portion of the interface module is implemented as either a graphical user interface, a web service, or a command line.

14. A method for web data transformation sourcing, comprising:
providing a set of original input data types as input to a web source search engine, wherein each original input data type in the set of original input data types is a respective structured piece of data that has semantic meaning;
providing a set of ultimate output data types as input to the web source search engine, wherein each ultimate output data type in the set of ultimate output data types is a respective structured piece of data that has semantic meaning;
operating the web source search engine to automatically search for one or more web based sources that will transform the set of original input data types into the set of ultimate output data types and to determine multiple transformation paths by which the set of original input data types is transformed into the set of ultimate output data types;
upon locating the one or more web based sources, operating the web source search engine to automatically generate a universal resource locator (URL) that upon execution will utilize the one or more web based sources to provide output data corresponding to the set of ultimate output data types based on input data corresponding to the set of original input data types;
digitally conveying the generated URL for use in web data transformation in which output data corresponding to the set of ultimate output data types is to be generated based on input data corresponding to the set of original input data types; and
operating the web source search engine to generate a cost value for each of the multiple transformation paths, wherein each cost value is generated in accordance with a cost function.

15. The method for web data transformation sourcing as recited in claim 14, wherein the set of original input data types and the set of ultimate output data types are respectively obtained from a data type hierarchy, wherein the data type hierarchy includes a description of each data type known within an existing population of web based sources.

16. The method for web data transformation sourcing as recited in claim 14, further comprising:
upon failing to locate one or more web based sources that will transform the set of original input data types into the set of ultimate output data types, operating the web source search engine to automatically determine an expanded set of original input data types that will provide for location of one or more web based sources defined to transform the expanded set of original input data types into the set of ultimate output data types;
digitally conveying the expanded set of original input data types; and
digitally conveying the generated URL for use in web data transformation in which output data corresponding to the set of ultimate output data types is to be generated based on input data corresponding to the expanded set of original input data types.

17. The method for web data transformation sourcing as recited in claim 14, further comprising:
upon failing to locate one or more web based sources that will transform the set of original input data types into the set of ultimate output data types, operating the web source search engine to automatically determine one or more alternate output data types into which the set of original input data types can be transformed by the available web based sources;
digitally conveying the one or more alternate output data types; and
digitally conveying the generated URL for use in web data transformation in which output data corresponding to the one or more alternate output data types is to be generated based on input data corresponding to the set of original input data types.

18. The method for web data transformation sourcing as recited in claim 14, wherein the cost function accounts for latency and restrictions associated with each of one or more segments which define a given transformation path.

19. The method for web data transformation sourcing as recited in claim 14, further comprising:
generating an index of web based sources as the web source search engine operates to automatically search for one or more web based sources that will transform the set of original input data types into the set of ultimate output data types, wherein the index of web based sources includes an identifier of each examined web based source and its corresponding input and output data types.

20. The method for web data transformation sourcing as recited in claim 19, further comprising:
operating the web source search engine to search the index of web based sources for one or more web based sources that will transform the set of original input data types into the set of ultimate output data types.

21. The method for web data transformation sourcing as recited in claim 14, further comprising:
operating the web source search engine to search open data tables that include references to web based sources and associated input and output data types as part of searching for one or more web based sources that will transform the set of original input data types into the set of ultimate output data types.

22. The method for web data transformation sourcing as recited in claim 21, wherein each open data table is accessible through an associated URL, and wherein the open data table includes binding data which binds one or more web data sources referenced within the open data table to a query language web service, the binding data including instructions to the query language web service with regard to querying the one or more web data sources for specific data present at the one or more web data sources.

23. The method for web data transformation sourcing as recited in claim 22, wherein the query language web service is defined to expose a query language for specification of a particular web data source to be queried, data types to be queried within the particular web data source, and one or more operations to be performed on the particular web data source.

24. The method for web data transformation sourcing as recited in claim 23, wherein the generated URL is defined to be executable through the query language web service.

25. A method for web data transformation sourcing, comprising:
provided a set of original input data types as input to a web source search engine, wherein each original input data type in the set of original input data types is a respective structured piece of data that has semantic meaning;
operating the web source search engine to automatically search for one or more web based sources that will transform the set of original input data types into one or more output data types, wherein each of the one or more output data types is a respective structured piece of data that has semantic meaning;
upon locating the one or more web based sources, operating the web source search engine to automatically generate a plurality of universal resource locators (URLs) as a corresponding plurality of transformation solutions that each upon execution will utilize at least one of the one or more web based sources to provide output data corresponding to the one or more output data types based on input data corresponding to the set of original input data types;
determining a cost value of each of the plurality of transformation solutions, wherein each cost value is determined in accordance with a cost function; and
digitally conveying the one or more output data types and the plurality of transformation solutions and the cost values of the plurality of transformation solutions.

26. A method for web data transformation sourcing, comprising:
providing a set of ultimate output data types as input to a web source search engine, wherein each ultimate output data type in the set of ultimate output data types is a respective structured piece of data that has semantic meaning;
operating the web source search engine to automatically search for one or more web based sources that will transform one or more input data types into the set of ultimate output data types, wherein each of the one or more input data types is a respective structured piece of data that has semantic meaning;
upon locating the one or more web based sources, operating the web source search engine to automatically generate a plurality of universal resource locators (URLs) as a corresponding plurality of transformation solutions that each upon execution will utilize at least one of the one or more web based sources to provide output data corresponding to the set of ultimate output data types based on input data corresponding to the one or more input data types;
determining a cost value of each of the plurality of transformation solutions, wherein each cost value is determined in accordance with a cost function; and
digitally conveying the one or more input data types and the plurality of transformation solutions and the cost values of the plurality of transformation solutions.

* * * * *